United States Patent
Wang et al.

(10) Patent No.: US 10,867,355 B1
(45) Date of Patent: Dec. 15, 2020

(54) COMPUTER IMPLEMENTED METHODS SYSTEMS AND ARTICLES OF MANUFACTURE FOR PREPARING ELECTRONIC TAX RETURN WITH ASSUMPTION DATA

(71) Applicant: Intuit Inc., Mountain View, CA (US)

(72) Inventors: Gang Wang, San Diego, CA (US);
Kevin M. McCluskey, Carlsbad, CA (US); Luis F. Cabrera, Bellevue, WA (US)

(73) Assignee: INTUIT INC., Mountain View, CA (US)

( * ) Notice: Subject to any disclaimer, the term of this patent is extended or adjusted under 35 U.S.C. 154(b) by 541 days.

(21) Appl. No.: 14/448,678

(22) Filed: Jul. 31, 2014

(51) Int. Cl.
*G06Q 40/00* (2012.01)
*G06F 3/0484* (2013.01)
*G07F 19/00* (2006.01)

(52) U.S. Cl.
CPC ......... *G06Q 40/123* (2013.12); *G06F 3/0484* (2013.01)

(58) Field of Classification Search
None
See application file for complete search history.

(56) References Cited

U.S. PATENT DOCUMENTS

| | | |
|---|---|---|
| 4,213,251 A | 7/1980 | Foundos |
| 4,809,219 A | 2/1989 | Ashford et al. |
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |
| 6,535,883 B1 | 3/2003 | Lee et al. |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Final Office Action dated Jun. 6, 2017 in U.S. Appl. No. 14/462,411, (20pges).

(Continued)

*Primary Examiner* — Jason Borlinghaus
(74) *Attorney, Agent, or Firm* — DLA Piper LLP (US)

(57) ABSTRACT

Computer-implemented methods, systems and articles of manufacture for populating an electronic tax return with assumption data and managing assumption data. A user interface controller in communication with a logic agent and a data store shared with the logic agent receives user data, selects a configuration file based at least in part upon the user data, reads or executes the selected configuration file to determine assumption data of the configuration file or to identify assumption data in an electronic data source. The assumption data is written by the user interface controller to the data store so that it can be read by the logic agent, which generates a non-binding suggestion regarding a question or tax topic that the user interface controller may present to the user based at least in part upon the assumption data.

31 Claims, 20 Drawing Sheets

(56) References Cited

U.S. PATENT DOCUMENTS

| | | |
|---|---|---|
| 6,601,055 B1 | 7/2003 | Roberts |
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison |
| 7,716,094 B1 | 5/2010 | Sutter et al. |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,767 B1 | 3/2011 | Cheatham et al. |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown |
| 8,086,970 B2 | 12/2011 | Achtermann et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B2 | 9/2014 | Baker |
| 8,892,467 B1 | 11/2014 | Ball |
| 8,949,270 B2 | 2/2015 | Newton et al. |
| 9,372,687 B1 | 6/2016 | Pai |
| 9,690,854 B2 | 6/2017 | Stent et al. |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0065831 A1* | 5/2002 | DePaolo ............... G06F 17/243 |
| 2002/0107698 A1 | 8/2002 | Brown et al. |
| 2002/0111888 A1 | 8/2002 | Stanley |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1* | 4/2004 | Morano ............... G06Q 20/207 705/19 |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155618 A1 | 7/2006 | Wyle |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1* | 2/2007 | Murray ............... G06F 17/243 705/31 |
| 2007/0033117 A1* | 2/2007 | Murray ............... G06F 17/243 705/31 |
| 2007/0033130 A1 | 2/2007 | Murray |
| 2007/0055571 A1 | 3/2007 | Fox et al. |
| 2007/0094207 A1 | 4/2007 | Yu |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendori et al. |
| 2010/0131394 A1 | 5/2010 | Rutsch |
| 2010/0153138 A1 | 6/2010 | Evans |
| 2011/0004537 A1 | 1/2011 | Allanson et al. |
| 2011/0078062 A1 | 3/2011 | Kleyman |

(56) References Cited

U.S. PATENT DOCUMENTS

| | | |
|---|---|---|
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0005144 A1* | 1/2012 | Cutler ................ G06N 5/025 706/47 |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pat et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Office Action dated Sep. 14, 2017 in U.S. Appl. No. 14/530,159, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).

(56) References Cited

OTHER PUBLICATIONS

Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018,
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Communication pursuant to Rules 70(2) and 70a(2) EPC dated Apr. 25, 2018 in European Patent Application No. 16843282.1-1217, (1page).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).

(56) References Cited

OTHER PUBLICATIONS

Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Vanderbilt University, "Free tax prep help available for Vanderbilt employees", Feb. 6, 2014, Vanderbilt University, p. 1-3 [NPL-1].
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 141462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).

(56) References Cited

OTHER PUBLICATIONS

Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated may 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Action dated Dec. 28, 2017 in U.S. Appl. No. 141097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Response dated Dec. 28, 2017 in U.S. Appl. No. 14/701,149, filed Apr. 30, 2015, (46pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).

(56) References Cited

OTHER PUBLICATIONS

Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
U.S. Appl. No. 16/206,260, filed Nov. 30, 2018, Pending.
U.S. Appl. No. 14/462,058, filed Aug. 18, 2014, Pending.
U.S. Appl. No. 14/555,902, filed Nov. 28, 2014, Pending.
U.S. Appl. No. 14/701,192, filed Apr. 30, 2015, Pending.
U.S. Appl. No. 14/461,982, filed Aug. 18, 2014, Pending.
U.S. Appl. No. 14/555,939, filed Nov. 28, 2014, Issued.
U.S. Appl. No. 16/206,260, filed Nov. 30, 2018.
U.S. Appl. No. 14/462,058, filed Aug. 18, 2014.
U.S. Appl. No. 14/555,902, filed Nov. 28, 2014.
U.S. Appl. No. 14/701,192, filed Apr. 30, 2015.
U.S. Appl. No. 14/461,982, filed Aug. 18, 2014.
U.S. Appl. No. 14/555,939, filed Nov. 28, 2014.
Partial File Wrapper History of U.S. Appl. No. 16/206,260 filed Nov. 30, 2018 captured from Pair on Aug. 26, 2020 (Aug. 20, 2020-present).

* cited by examiner

|    | A | B | C | D | E | F | G | Goal |
|----|---|---|---|---|---|---|---|------|
| R1 | Y | ? | N | ? | ? | ? | ? | Yes  |
| R2 | Y | ? | Y | ? | ? | ? | Y | Yes  |
| R3 | N | Y | ? | ? | ? | ? | Y | Yes  |
| R4 | N | Y | ? | N | N | N | ? | Yes  |
| R5 | N | N | ? | ? | ? | ? | ? | Yes  |

(Rows) (Rules 461) — Columns (Questions 462)

Cross Out Since Answer to Question A is "yes"

| Configuration File 1102a | Assumption Data 1102b | Assumption Data to User? 1102c | User Confirmed Assumption Data? 1102 | Assumption Data Overwritten? 1102e | Configuration File Flag 1102f | Instance / Field Flag 1102g |
|---|---|---|---|---|---|---|
| Config A | Assumption A | Y | Y | N | N | Y |
| Config B | Assumption B | Y | N | Y | Y | Y |
| Config C | Assumption C | N | N | N | N | N |

FIG. 11

| Imported Data from Electronic Financial Documents  1505 | Imported from Prior Year Electronic Tax Return  1504 |
| --- | --- |
| Manually Entered Data  1503 | |
| Assumption Data – Corrected by User  1502 | Assumption Data - Confirmed by User  1501 |

FIG. 15

COMPUTER IMPLEMENTED METHODS SYSTEMS AND ARTICLES OF MANUFACTURE FOR PREPARING ELECTRONIC TAX RETURN WITH ASSUMPTION DATA

SUMMARY

Embodiments are directed to determining how to automatically populate at least a portion of an electronic tax return for a user of a tax return preparation application.

Certain embodiments are directed to making inferences or assumptions about a user's electronic tax return data and changing whether and how certain questions or tax topics are presented to the user during preparation of an electronic tax return. Certain embodiments are directed to making these inferences or assumptions using heterogeneous data sources such that data received from one data source of a first type is used to identify or select assumption data in another data source of a different type.

Certain embodiments are directed to populating at least a portion of an electronic tax return with assumption data, presenting the assumption data to the user, and allowing a user to later modify or correct the assumption data if needed. Thus, embodiments deduce or assume answers or data for the user, and the user can then later confirm or correct the assumption data as needed.

Certain embodiments are directed to configurable assumption or default data of electronic tax returns, and utilizing assumption or default data until it is corrected or overwritten with different or corrected data from a trusted or pre-determined source.

Certain embodiments are directed to providing a starting point of electronic tax return data that can be used to determine which questions or tax topics to present to the user before the user has even entered any data. The starting point may be only assumption data or a combination of data received from a source and assumption data determined based at least in part upon the received or determined user data. Embodiments are also directed to populating other fields of an electronic tax return as the user progresses through interview screens, thus providing for automatic population in conjunction with user entry or user directed import of tax return data at various stages of preparation of the electronic tax return. Certain embodiments are directed to a modular system that provides for selective supplemental population of an electronic tax return based on user data.

Certain embodiments are also directed to tracking the use of assumption or default data such as when it was utilized, why it was selected for inclusion in an electronic tax return, and whether and when it was confirmed or corrected.

Certain other embodiments are directed to intelligent configuration file modification and/or generation in view of assumption or default data feedback. The feedback may involve how often assumption or feedback data is confirmed by a user versus how often it is corrected or modified.

One embodiment is directed to a computer-implemented method for assumption or default data management during preparation of an electronic tax return prepared by a user of a tax return preparation application. The method is performed by a computer executing the tax return preparation application comprising a user interface controller, a logic agent and a data store. One embodiment of a method comprises the user interface controller receiving user data, selecting a configuration file based at least in part upon the received data and reading or executing the selected configuration file to determine assumption data. The user interface controller determines whether a field in the shared data store associated with the assumption data is populated, and if not, writes the assumption data to the associated field.

Other embodiments are directed to systems for managing assumption or default data during preparation of an electronic tax return prepared by a user of a tax return preparation application. According to one embodiment, a system comprises a user interface controller that accesses configuration files, and that is in communication with logic agent and a shared data store, and that is configured, operable or programmed to manage assumption or default data during preparation of an electronic tax return by a user of a tax return preparation application. The user interface controller is configured or programmed to receive user data, select a configuration file based at least in part upon the received user data and read or execute the selected configuration file to determine assumption data, determine whether a field in the shared data store associated with the assumption data is populated, and if not, write the assumption data to the associated field. System embodiments may also include one or more or all of system components such as the shared data store, the logic agent, a tax calculation engine, and configuration files. For example, one system embodiment comprises a user interface controller, a logic agent and a shared data store, wherein the user interface controller writes to the data store, the logic agent reads from the data store, and another system embodiment comprises these components and a tax calculation engine that reads from and writes to the shared data store.

Other embodiments are directed to a non-transitory computer-readable medium comprising instructions, which when executed by a processor of a computing device, causes the computing device to execute a process for assumption data management during preparation of an electronic tax return.

In a single or multiple embodiments, when the user interface controller determines that the associated field of the data store has already been populated, the data within the populated field is not overwritten by assumption data and instead the data within the populated field takes priority over the assumption data. However, when assumption data has been written to the data store, user interface controller may have the user confirm the assumption data to allow the user to correct it if needed, and if not corrected, the assumption data remains in the data store. Further, when assumption data initially populates a field of the data store, and other data for that field is subsequently receive, the UI controller may overwrite the assumption data with the other data if, for example, the other data was received from a pre-determined source. Further, in a single or multiple embodiments, when the user interface controller receives additional data from an electronic source after writing assumption data to the data store, the user interface controller can present an interview screen to the user requesting the user to confirm whether the assumption data or the received data should be utilized and correct or overwrite the assumption data as necessary.

In a single or multiple embodiments, when the user interface controller writes assumption data, the assumption data may be written to a single field of a single instance, to respective fields of respective instances. The instance may be generated or initialized for this purpose, or the user interface manager may write to an existing instance. Writing by the user interface controller may involve writing only assumption data or a combination of two or more of assumption data, received data and imported data to the data store.

In a single or multiple embodiments, the user interface controller maintains and updates a data structure such as a database or table with data about processing of assumption data. For example, the table may indicate the configuration file used to determine the assumption data, when the assumption data was first written to the data store, whether user confirmation of the confirmation data is needed, whether confirmation has been received, whether the assumption data was modified or corrected by the user, and whether configuration files or instances have been flagged to indicate the data as assumption data as opposed to other received or imported data. This may be used to track the effectiveness and accuracy of assumptions, and may also be used for automatic modification of a configuration file or generation of a new configuration file if different assumption data is to be utilized in view of tracked results to provide automated, intelligent feedback system for modifying or generating configuration files.

In a single or multiple embodiments, after the assumption data (and any other received or imported data) has been written by the user interface controller to the data store, a logic agent including a rule engine may read the data that is currently stored in the shared data store (which may be after calculations based on the runtime data are performed). The data read by the logic agent includes assumption data, and the logic agent processes the data to select a question or tax topic to present to the user based at least in part upon rules utilized by the logic agent and the assumption data. For example, the logic agent may access a decision table that specifies a plurality of rules and identifies a plurality of questions and respective answers to respective questions. Whether a rule applies is based at least in part upon answers in the form of the runtime data to respective questions. The logic agent determines which rules are applicable and which ones are not given the current runtime data that includes assumption data, and eliminates or disables at least one rule based at least in part upon the assumption data that is an answer to at least one question in the decision table, and selects a question or tax topic based at least in part upon remaining questions that may apply based at least in part upon one or more remaining rules of the plurality of rules.

In a single or multiple embodiments comprising or involving a tax calculation engine that also shares the data store with the user interface controller and the logic agent, the tax calculation engine reads runtime data from the data store including the assumption data and executes a calculation with the assumption data. The result that is based at least in part upon the assumption data is written to the data store, the logic agent can then read the current runtime data, including the result generated by the calculation engine from the data store that was based at least in part upon the assumption data, and use the decision table and runtime data to determine which rules are applicable and which ones are not, and select a question or tax topic based at least in part thereon to present to the user. According to one embodiment, the runtime data including assumption data is used to eliminate or disable certain rules which, in turn, affects which questions or topics are selected by the logic agent.

In a single or multiple embodiments, embodiments are used to initially partially populate an electronic tax return using assumption data, or a combination of assumption and received or imported data, stored to the shared data store. In other embodiments, assumption data is determined and written to the data storing at various times, e.g., in response to a trigger comprising receiving a pre-determined type of data or that the data of a pre-determined type satisfies pre-determined criteria.

In a single or multiple embodiments, processing of assumption data results in reduction in the number and/or types of questions or tax topics presented to the user since the assumption data can be used to disable or eliminate certain rules which, in turn, eliminates certain questions or tax topics from consideration.

In a single or multiple embodiments, the received user data is used to identify or select one or more configuration files from a plurality of configuration files, and the selected configuration file(s) may specify the assumption data and/or serve as a pointer or reference to assumption data stored elsewhere such as in another electronic data source or document (such as a prior year filed electronic tax return) or to a field or data of an account the user has with a financial management system (such as QUICKBOOKS and MINT financial management system or an account the user has with an online social networking website such as LINKEDIN and FACEBOOK on-line social networking websites.

BRIEF DESCRIPTION OF THE DRAWINGS

FIG. 7 illustrates an example of how a rule engine may process a decision table when determining which question to select;

FIG. 11 illustrates an example of a data structure utilized according to embodiments to track the status of assumption data;

FIG. 15 generally illustrates how an electronic tax return prepared according to embodiments may include different types of data from different types of sources, including assumption data determined according to embodiments, which may be confirmed or corrected by a user.

DETAILED DESCRIPTION OF ILLUSTRATED EMBODIMENTS

Embodiments are directed to computer-implemented methods, computerized systems and articles of manufacture or computer program products for populating at least a portion of an electronic tax return with inferred or assumption data that is not entered by a user of a tax return preparation application utilized to prepare an electronic tax return.

In contrast to known tax preparation applications that utilize pre-determined questions and pre-determined question sequences, are structured according to a tree structure, and that involve manual programming of tax logic as part of interview screens such that interview screens and associated tax logic are bound together, embodiments involve a modular interview engine that employs a rule engine or logic agent and a user interface (UI) management module or controller that are loosely coupled to each other such that the rule engine is dedicated to using tax or tax return related rules to generate results in the form of non-binding suggestions or recommendations for the UI controller. The UI controller decides whether and when to generate or select an interview screen including the subject matter of the non-binding suggestion. A non-binding suggestions may refer to or include a candidate or potential question identified by the rule engine based on the rule engine's analysis of runtime data and rules specified by a decision table derived from a completeness graph representing tax law or tax return requirements. With embodiments, a default data module of or utilized by the UI controller receives certain user data and deduces or makes assumptions about electronic tax return data. The assumption data is stored to a shared data store for inclusion in the electronic tax return without the user having to enter the assumption data.

For example, the UI controller may look up a configuration file applicable to data received by the UI controller. The configuration file is read or executed to determine the assumption data specified thereby, or to reference a field of another an electronic data source such as a prior year electronic tax return, prior or current year tax document, or an on-line source such as data of an account the user has with a financial management system or online social networking website. This assumption data, whether read from the configuration file or determined from another source referenced by the configuration file, is used to populate at least a portion of the electronic tax return such that the user is not required to manually enter data or import that data into the electronic tax return, thus reducing the time and effort required by the user to prepare an electronic tax return, while also avoiding transcription input errors, and improving the quality of filing by considering various aspects of a transaction. Further details regarding embodiments are described with reference to FIGS. 1-16.

Figure 1:
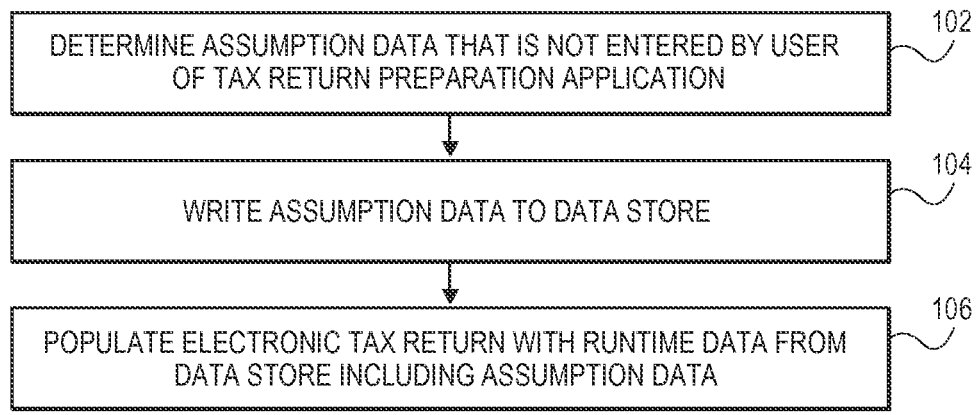
FIG. 1 is a flow diagram of one embodiment of a computer-implemented method for using assumption data to populate at least a portion of an electronic tax return.

Referring to FIG. 1, according to one embodiment, is directed to a computer implemented method in which inferred or assumption data (generally, assumption data) that is not entered by the user is determined by a user interface controller of a tax return preparation application executed by a computing apparatus at 102, and at 104, the UI controller writes the assumption data to a shared or community data store or dictionary of terms and their corresponding data, values or answers reflected in respective instances. At 106, the electronic tax return is populated with runtime or instance data provided by the UI controller such that at least a portion of the electronic tax return is populated without input or entry of the data by the user.

Figure 2:
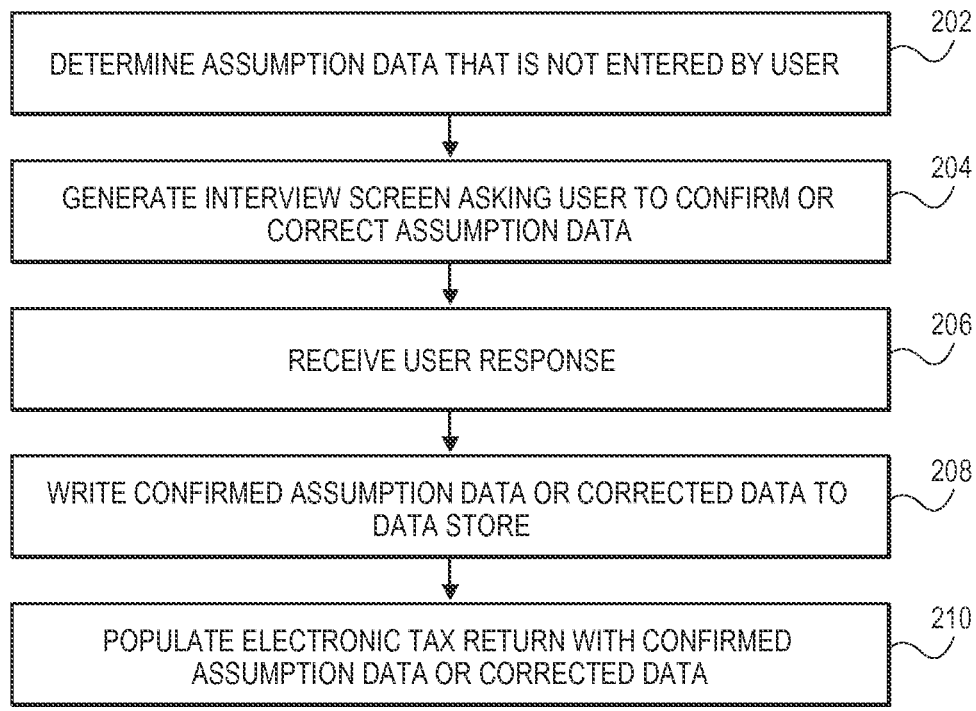
FIG. 2 is a flow diagram of one embodiment of a computer-implemented method for using assumption data to populate at least a portion of an electronic tax return and requesting and receiving user input regarding the assumption data.

Referring to FIG. 2, in another embodiment, at 202, the UI controller of a tax return preparation application executed by a computing apparatus determines assumption data that is not entered by the user, and at 204, generates an interview screen asking user to confirm or correct the assumption data. At 206, the user's response is received by the UI controller, and at 208, the UI controller writes the confirmed assumption data or corrected data provided by the user to data store, and at 210, the electronic tax return is populated with confirmed assumption data or corrected data.

Figure 3:
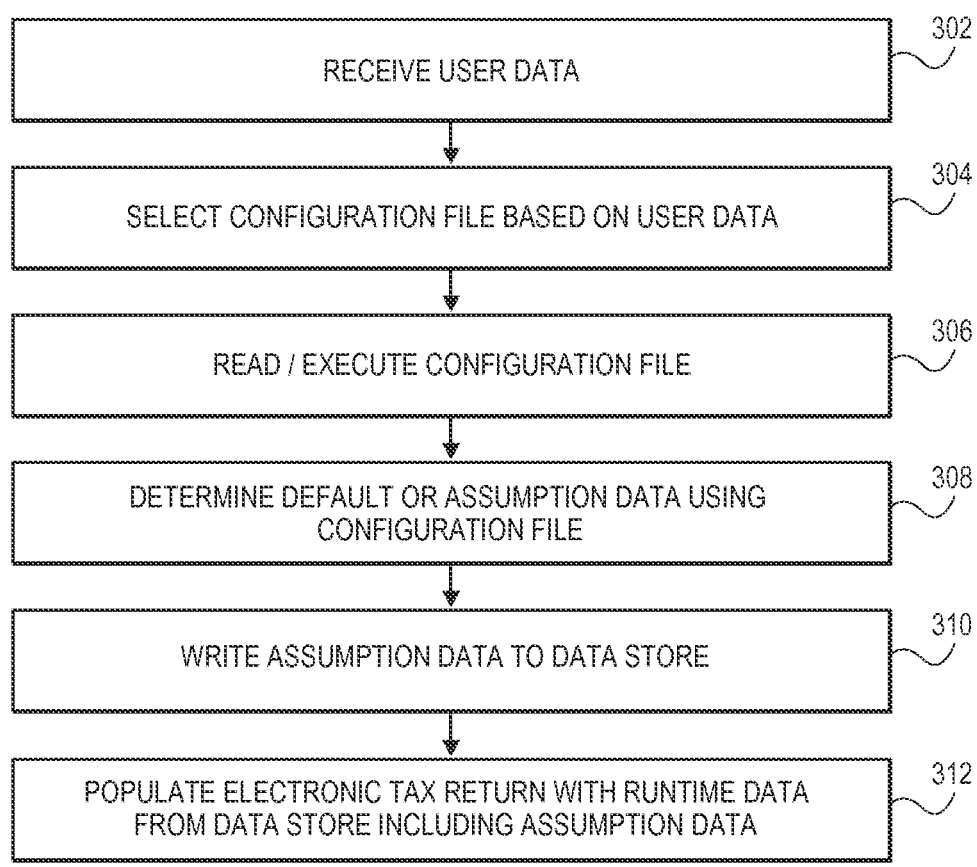
FIG. 3 is a flow diagram of one embodiment of a computer-implemented method for using assumption data to populate at least a portion of an electronic tax return using a configuration file.

Referring to FIG. 3, in yet another embodiment, at 302, a UI controller receives user data, and at 304, selects a configuration file based at least in part upon the user data. At 306, the UI controller reads or executes the configuration file, and at 308, determines assumption data from within the configuration file or from another electronic data source using the configuration file. At 310, the UI controller writes the assumption data to a data store, and at 312, the electronic tax return is populated with runtime or instance data including the assumption data retrieved from the data store.

Figure 4A:
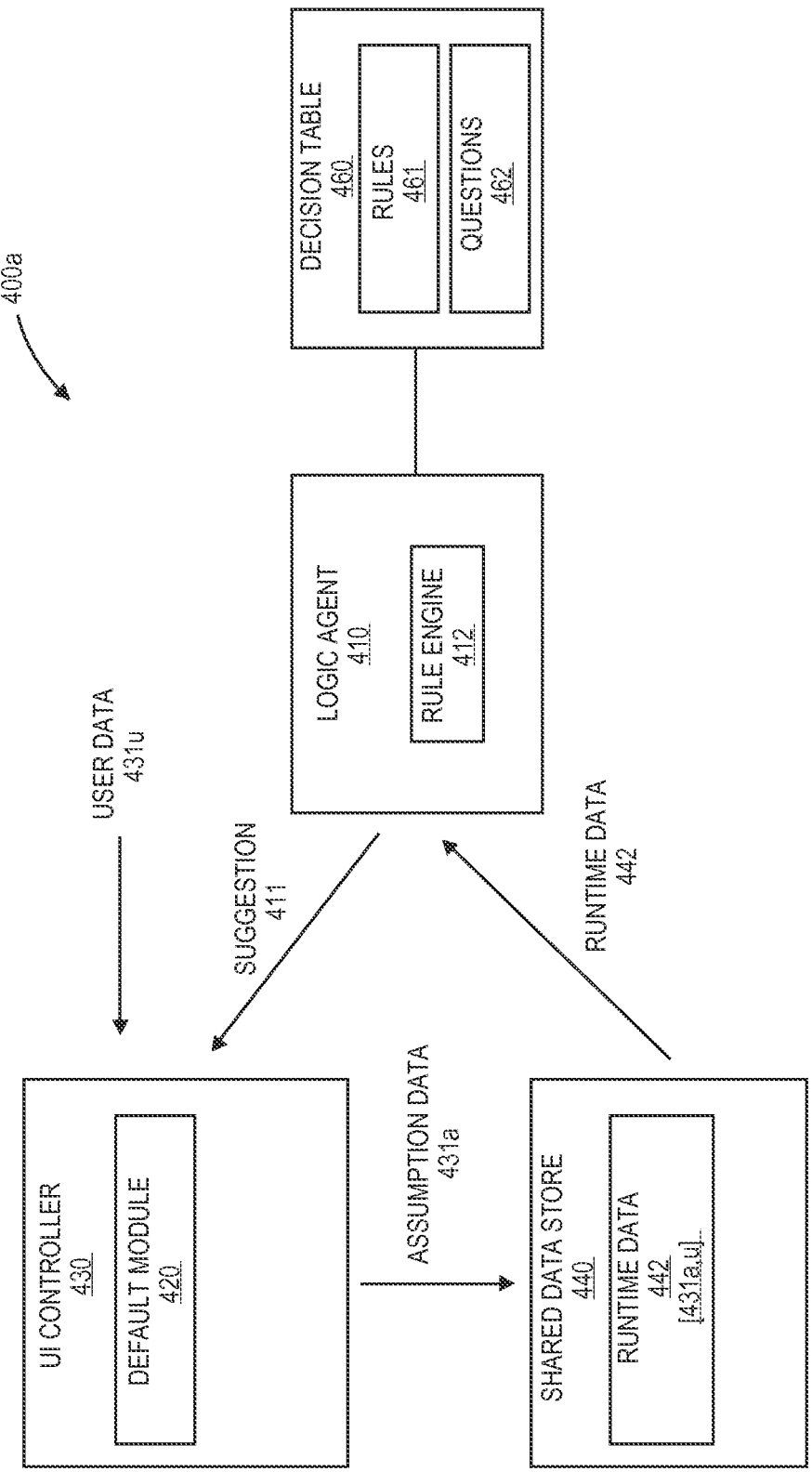
FIGS. 4A-B illustrate systems constructed according to embodiments for determining assumption data and populating at least a portion of an electronic tax return with assumption data.

Referring to FIG. 4A, in a system 400a constructed according to one embodiment, a logic agent 410 comprising a rule engine 412 is in communication with a UI management module or controller (UI controller 430) including or utilizing a default module 420. The logic agent 410 and the UI controller 430 are in communication with an intermediate or shared data store 440. The logic agent 410 can read runtime or instance data 442 from the data store 440, the UI controller 430 receives user data 431*u* ("u" referring to "user" data), and determines assumption data 431*a* ("a" referring to "assumption" data) based at least in part upon the user data 431*u* and writes determined assumption data 431*a* to the data store 440. The user may be the taxpayer or an accountant or tax professional that is preparing the electronic tax return on behalf of the taxpayer. For ease of explanation, reference is made generally to the user of the tax return preparation application. The runtime or instance data 442, which includes assumption data 431*a*, is read from the data store 440 and used by the logic agent 410 in connection with analyzing rules 461 that may or may not apply given the runtime or instance data 442 that are answers to questions in a decision table 460.

Figure 4B:
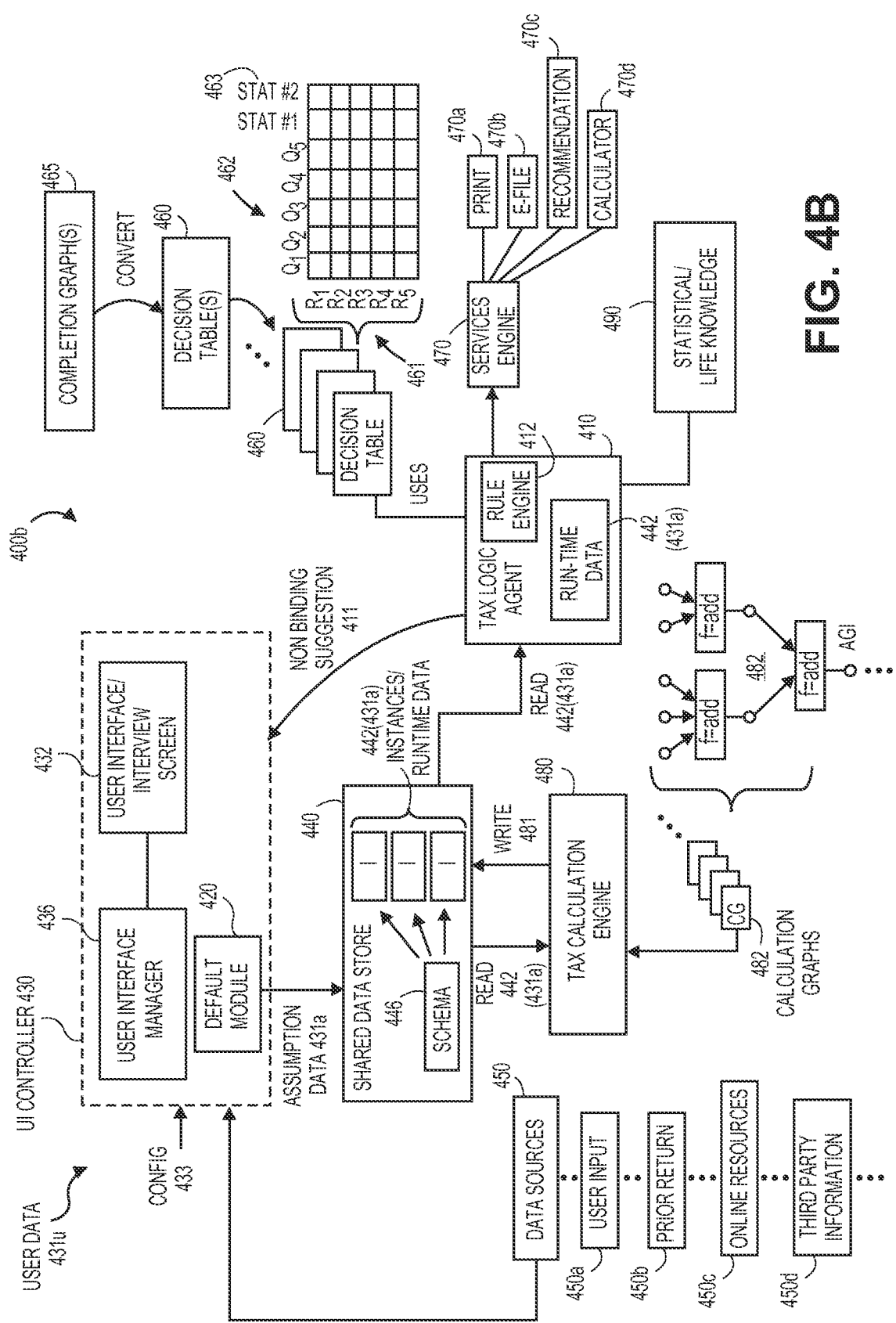

FIG. 4B is a more detailed illustration of a system 400*b* constructed according to one embodiment and that includes logic agent 410 comprising or executing a rule engine 412 based on runtime or instance data 442, a UI controller 430, a shared or intermediate data store 440, and a tax calculation engine 480.

The rule engine 412, which may be a drools expert engine or other rule engine, is operable to receive runtime or instance data 442 (generally, runtime data 442) that is based on a "dictionary" of concepts or terms of a data model or schema 446 (generally, schema 446). For example, the schema 446 may specify, define or list tax-related concepts or terms, e.g., by names, type or category and hierarchy such as "name," "social security number," "citizenship," "address," "employer," "interest," "dividends," "mortgage," "deduction," "tax credit," "capital gain," etc. The schema 446 may also specify a certain format of questions and answers (e.g., answer is binary (Y/N) or a number/value). An instance 447 is instantiated or generated for the collection of data received for each term or topic of the schema 446. It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. It will be understood that embodiments may utilize various other schemas, and that these schemas are provided as non-limiting examples of a schema 446 that can be utilized in embodiments.

Runtime data 442 stored in the shared data store 440 is used, e.g., by the logic agent 410 or a separate population component, to populate corresponding fields of an electronic tax return or electronic tax form used to prepare an electronic tax return and may be received from or based on data from various data sources 450*a-d* (generally, data source 450). Examples of data sources 450 include user input, such as a user answer to a question presented in an interview screen, data imported from a prior year electronic tax return, data from online resources (such as online social networks or other online resources) and third parties databases or resources (such as government databases or documents, such as property tax records, Department of Motor Vehicle (DMV) records, etc. The rule engine 412 reads runtime data 442 including assumption data 431*a* from the shared data store 440 and utilizes or executes rules 461 expressed in the decision table 460 using the runtime data 442 in order to determine which questions 462 still need to be presented to the user based on the runtime data 442 being answers to various questions 462 in the decision table 460. As described in further detail below, data from a data source 450 may be user data 431*u* that is received for the purpose of determining assumption data 431*a*, and in other embodiments, an electronic data source 450 can serve as a source of assumption data 431*a*.

Various types of rules 461 may be utilized by embodiments. For example, "tax" rules 461 that are utilized by the rule engine 412 may specify which types of data or tax documents are required, or which fields or forms of the electronic tax return should be completed. One example is if a taxpayer is married, then the electronic tax return is required to include information about a spouse. A tax rule 461 may involve if a certain box on a form (e.g., Box 1 of Form W2) is greater than a pre-determined amount, then certain fields of the electronic tax return (e.g., withholding fields) cannot be left empty and must be completed. Thus, tax rules 461 may reflect various tax requirements and are expressed using the concepts or terms of the data model or schema 446. As another example, other rules 461 may specify tax consequences or calculations and for this purpose, the logic agent 410 may be in communication with other modules or services 470*a-d* (generally, "Additional Services" such as printing, e-filing, tax recommendations, calculation).

Rules 461 can also be used for the purpose of identifying or narrowing which questions 462 are identified as potential questions to be presented to the user. This may involve utilizing rules 461 based on one or more associated data structures such as a decision table 460, which is based on a completion graph 465, which recites, for example, the requirements of a tax authority or a tax authority rules or laws. The decision table 460 may be used for invalidation of potential questions 461 or topics and input or runtime data 442 requirements.

Figure 5:
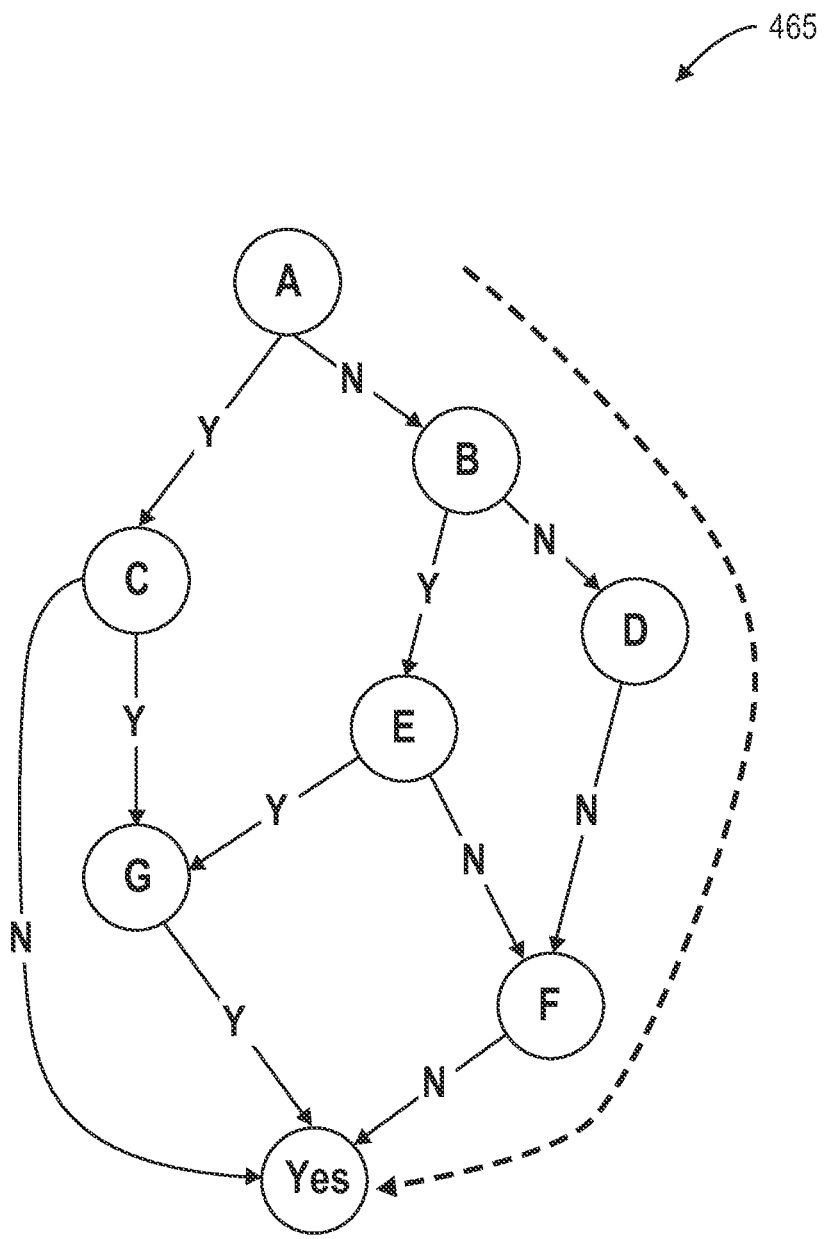
FIG. 5 illustrates an example of a directed graph or completeness graph.
Figure 6:
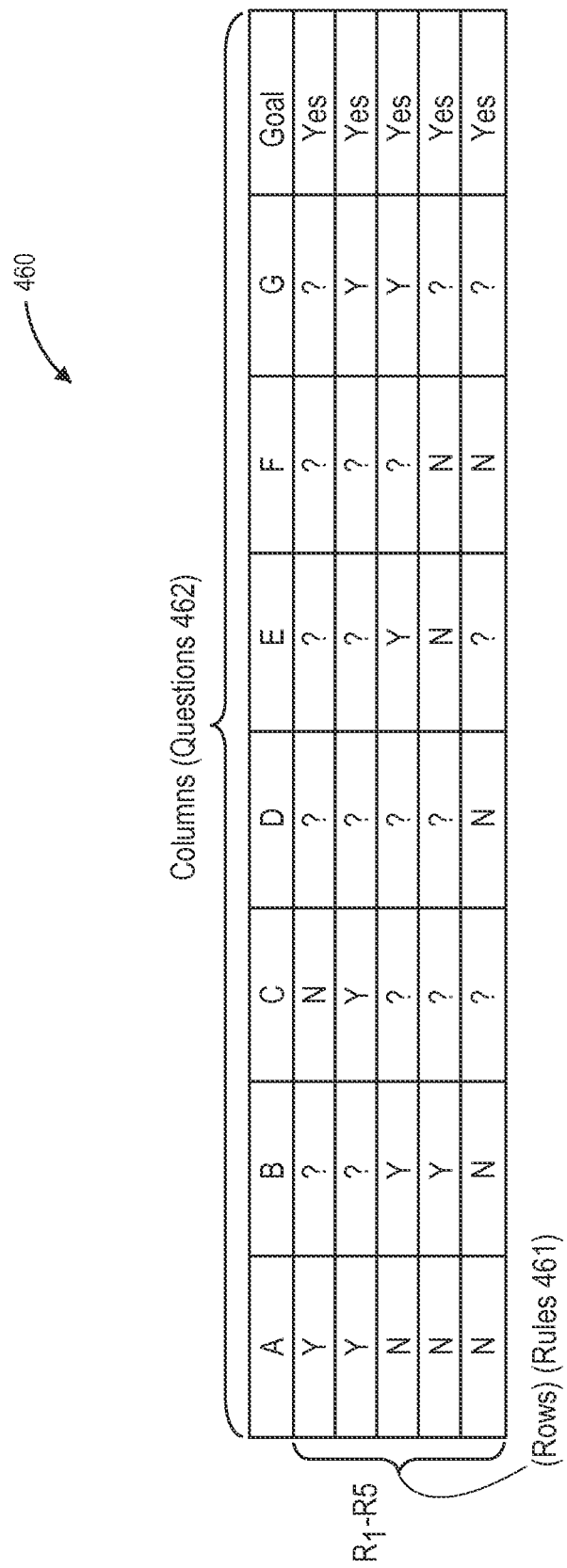
FIG. 6 is an example of a decision table generated based on the directed graph or completeness graph shown in FIG. 5, in which rows specify rules, and columns identify questions.

For example, referring to FIGS. 5-7, and as described in further detail in U.S. application Ser. No. 14/097,057, filed Dec. 4, 2013, entitled Methods Systems and Computer Program Products for Applying Generated Rules for Personalized Interview Experience" and U.S. application Ser. No. 14/206,834, filed Mar. 12, 2014, entitled "Computer Implemented Methods Systems and Articles of Manufacture for Suggestion-Based Interview Engine for Tax Return Preparation Application, the contents of which are expressly incorporated herein by reference as though set forth herein in full, a completeness or directed graph 465 reflects a flow of questions and answers of requirements, rules or laws a tax authority (as generally illustrated in FIG. 5), and the directed graph 465 is converted into a decision table 460 (as generally illustrated in FIG. 6). The decision table 460 reflects the question-and-answer flow of the completeness or directed graph 465. In the illustrated example, rows of the decision table 460 define rules 461 (e.g., Rules R1-R5 as shown in FIG. 6), and columns of the decision table 460 indicate questions 462 (Q1-Q5 shown in FIG. 4, or Questions A-G shown in FIG. 6). Runtime data 442 serves as answers to questions 462 to fill in the decision table 460 and to determine or select questions 462 that can be selected by the rule engine 412 to be presented to the user. In one embodiment, statistical data 463 (which may be appended as columns to the rule-question decision table 460, and received from or based on data collected by statistical/life knowledge module 490 described in further detail below) may indicate how likely a question 462 is to be relevant to a user given a set of runtime data 442 and may be utilized by the rule engine 442 when determining which question or topic 462 to select.

The logic agent 410 may also receive or otherwise incorporate information from a statistical/life knowledge module 490. The statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters. The logic agent 410 may use this knowledge to weight particular topics or questions related to these topics when processing rules 461 and questions 462 and generating non-binding suggestions 411. For example, questions 461 about home mortgage interest may be promoted or otherwise given a higher weight for users in particular zip codes or income levels. Statistical knowledge may apply in other ways as well. For example, tax forms often require a user to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts such as 403(*b*) retirement accounts. This information may then be used by the logic agent 410 when generating its suggestions 411. For example, rather than asking generically about retirement accounts, the suggestion 411 can be tailored directly to a question about 403(*b*) retirement accounts.

Data that is contained within the statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 490. This information may be periodically refreshed or updated to reflect the most up-to-date relationships. Generally, the data contained in the statistic/life knowledge module 490 is not specific to a particular tax payer but is rather generalized to characteristics shared across a number of tax payers although in other embodiments, the data may be more specific to an individual taxpayer.

In one embodiment, the rule engine 412 reads the runtime data 442 and uses that data 442 as answers or inputs to the decision table 460 to eliminate rules 461 that may apply which, is used to eliminate candidate questions 462 from consideration rather than requiring the user to step through each question of a pre-determined sequence of questions in order to conclude that a particular tax situation or topic applies to the user.

For example, continuing with the example shown in FIGS. 5-6, and with further reference to FIG. 7, runtime data 442 that is known is used to determine which rows or rules 461 to cross out in the decision table 460. In the illustrated example, if it is known from the runtime data 442 that the answer to Question A is "Y" then rules 461 R3-R5 involving a "N" answer to Question A are not applicable, and those rows of the decision table 460 including a "N" answer to Question A (i.e., the bottom three rows in the illustrated example) can be crossed out or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining questions 461 that require answers based on the current runtime data 442 include Questions C and G. Thus, the rule engine 412 uses the decision table 460 to select one or more rules 461 and determine or select one or more candidate questions 462 that are unanswered in view of the current runtime or instance data 442. While actual implementation may involve decision tables that are more complex, FIGS. 5-7 are provided for purposes of illustration and explanation.

The logic agent 410 provides to the UI controller 430 a non-binding suggestion 411 comprising a selected question or topic 461 to be addressed. In the illustrated embodiment, the UI controller 430 includes a UI or user experience manager 436 that determines how to process the non-binding suggestions 411 with the selected questions or topics 461 and generates an interview screen 432 for the UI or selects an interview screen 432 of the UI based on the question or topic 461 of the non-binding suggestion 411.

The UI controller 430, in one embodiment, includes a suggestion resolution element, a generator element, and an interview screen management element or flow/view management" module as described in U.S. application Ser. No. 14/206,834, previously incorporated herein by reference. The suggestion resolution element is responsible for resolving the strategy of how to respond to incoming non-binding suggestions 441 provided by the logic agent 410. For this purpose, the suggestion resolution element may be programmed or configured or controlled by configuration files 433 that specify whether, when and/or how non-binding suggestions 411 are processed (e.g., priority, sequence, timing, in a current, next or subsequent interview screen, random, never or ignore, not until additional data received).

For example, a configuration file 433 may specify one or more or all of how to process the non-binding suggestion 411 based on whether to consider or ignore the non-binding suggestion 411, when the non-binding suggestion 411 should be processed, content of an interview screen 432 based on the non-binding suggestion 411, how to present content or interview screens 432 based on the non-binding suggestion 411 in view of a form factor or type of a computing device utilized by the user of the tax preparation application or that executes the tax return preparation application embodying system components described above with reference to FIGS. 3-7, which non-binding suggestion(s) 411 have priority over others or a sequence of non-binding suggestions 411, which configuration files 433 have priority over others or a sequence of configuration files 433 in the event that multiple configuration files 433 may potentially be used for purposes of configuration conflict resolution. For example, a configuration file 433 may specify that a non-binding suggestion 411 should be processed or addressed immediately or on the spot, next, at a later time, after certain or other additional tax return data has been received, or at the end of the process. Configuration files 433 may also specify whether non-binding suggestions 411 should be processed individually or aggregated for processing as a group with resolution of any priority issues. As another example, a configuration file 433 may specify that content should be adjusted or whether or how non-binding suggestions 411 should be processed in view of a screen size or dimension of a type of computing device that executes the tax preparation application since questions or more content may be more suitable for computing devices such as laptop and desktop computers, which have larger screens than smaller mobile communication devices such as smartphones.

The UI controller 430 generates the resulting user interaction or experience or creates or prepares an interview screen 432 or content thereof based on a library of visual assets such as pre-programmed interview screens or interview screens that are templates and that can be populated by the UI controller with a question 461 or topic of a non-binding suggestion 411.

With continuing reference to FIG. 4, the tax calculation engine 480 reads the current runtime data 442 from the shared data store 440, and uses this data as inputs into respective nodes of one or more calculation graphs 482, and respective results or values are calculated with associated functions that are executed with the input data. New or resulting data is written back by the tax calculation engine 480 to the shared data store 440 for subsequent reading by the logic agent 410. For example, if the runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, the tax calculation engine 480 will run the calculation graphs 482 again to calculate a new AGI value, which would then be stored to the data store 482.

Additionally, according to embodiments, a default or module 420 (generally, default module 420) may be a component of the UI controller 430 as shown in FIGS. 4A-B or utilized by the UI controller 430 or component thereof for purposes of deducing, inferring or making assumptions about what electronic tax return data applies to a user given certain user data 431u received from one or more data sources 450. Thus, embodiments involve a default manager 420 that determines data for the electronic tax return without requiring the user to enter that data, thus providing partial automatic population of the electronic tax return, as described in further detail below with reference to FIGS. 8A-16.

Figure 8A:
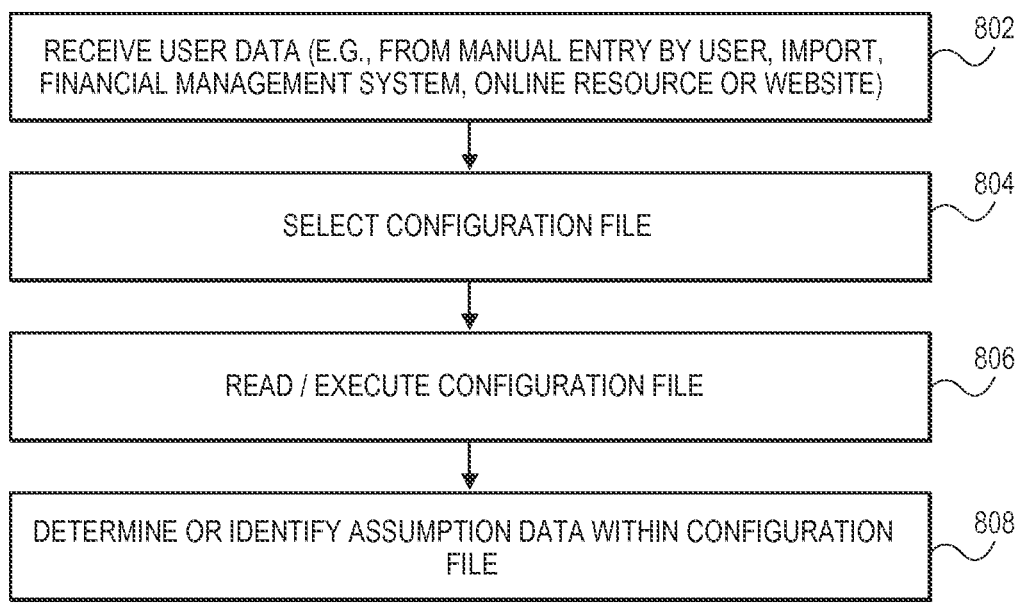
FIG. 8A is a flow diagram illustrating one embodiment for determining assumption data within a configuration file.
Figure 8B:
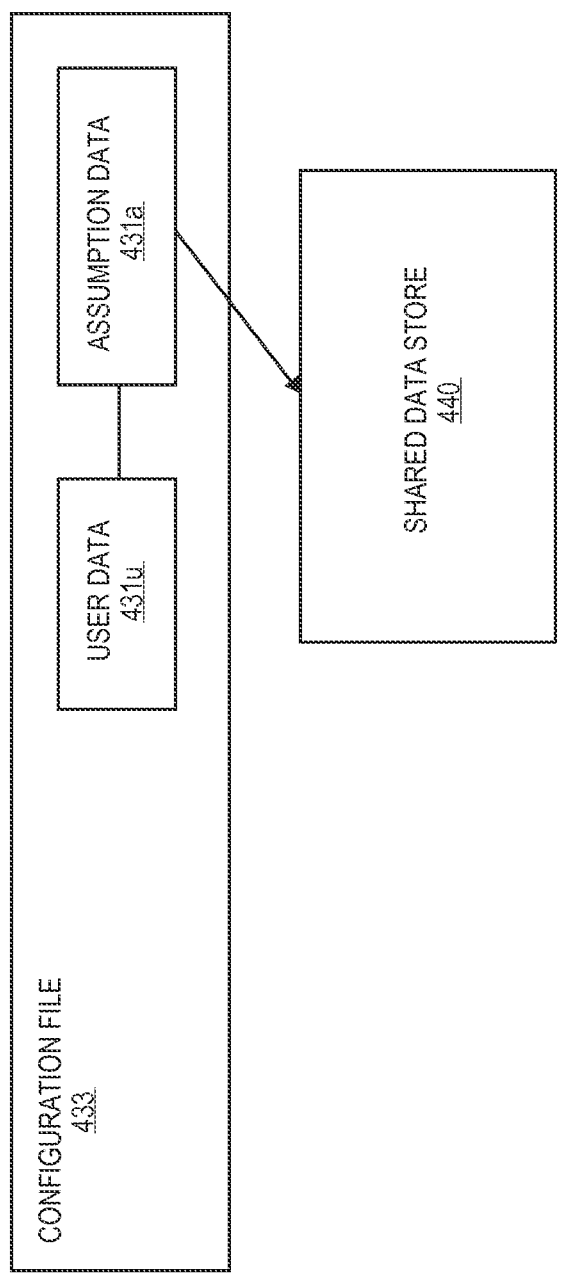
FIG. 8B depicts assumption data within a configuration file.
Figure 8C:
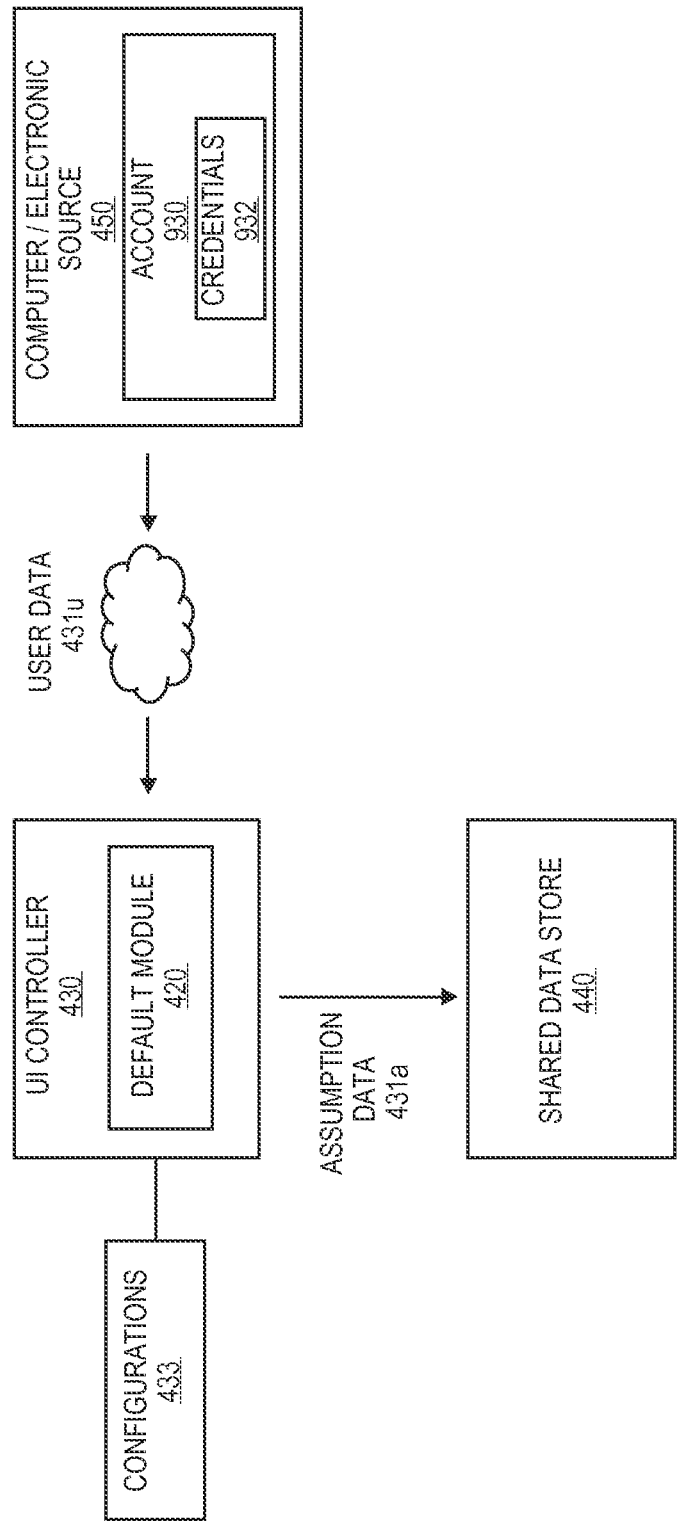
FIG. 8C illustrates an embodiment in which user data is received from an electronic source and assumption data from a configuration file is used to populate a data store.

Referring to FIGS. 8A-C, in a computer-implemented method according to one embodiment, at 802, the UI controller 430 receives user data 431u. The user data 431u may be data of one or more types from one or more sources 450 including one or more of data that is manually entered into a field of an interview screen by the user, data that is imported from a prior year electronic tax return, data that is imported from a financial management system such as QUICKEN financial management system available from Intuit Inc., data from another online resource or website such as a search result generated using a search engine such as GOOGLE search engine, and data of an account the user has with an online social networking website such as facebook.com or linkedin.com. At 804, the UI controller 430 uses the received user data 431u to select one or more configuration files 433, and at 806, reads or executes the one or more configuration files 433 to determine or identify assumption data 431a included, programmed or encoded within the configuration files 433. The assumption data 431a specified by the configuration file 433 can be programmed by the host and based at least in part upon statistical data of other users of the tax return preparation application for prior and/or current tax years.

For example, referring to FIG. 8B, which generally depicts a configuration file 433 that identifies certain user data 431u or user data 431u of a certain type or category. As discussed above, a configuration file 433 utilized to determine assumption data 431a may also be used for purposes of processing non-binding suggestions 411, or separate configuration files 433 may be used for processing non-binding suggestions 411 and determining assumption data 431a.

Thus, when such user data 431u is received by the UI controller 430, the UI controller 430 searches configuration files to identify one or more configuration files that include the user data 431, and one or more configuration files 433 are selected by the UI controller 430. The user data 431u may be received through an interview screen or import using a local file, or accessed from a remote resource through a network as shown in FIG. 8C. In the embodiment illustrated in FIG. 8B and as shown in FIG. 8C, the configuration file 433 includes the associated assumption data 431a associated with or linked with user data 431u such that, at 806, the UI controller 430 reads the assumption data 431a from the selected configuration file 433 and writes the assumption data 431a to the shared data store 440 at 808. Configuration files 433 can be programmed and modified by the host of the system or the UI controller 430 can track assumption data 431a for processing for intelligent modification of a previously used configuration file 433 or generation of a new configuration file 433.

Figure 9A:
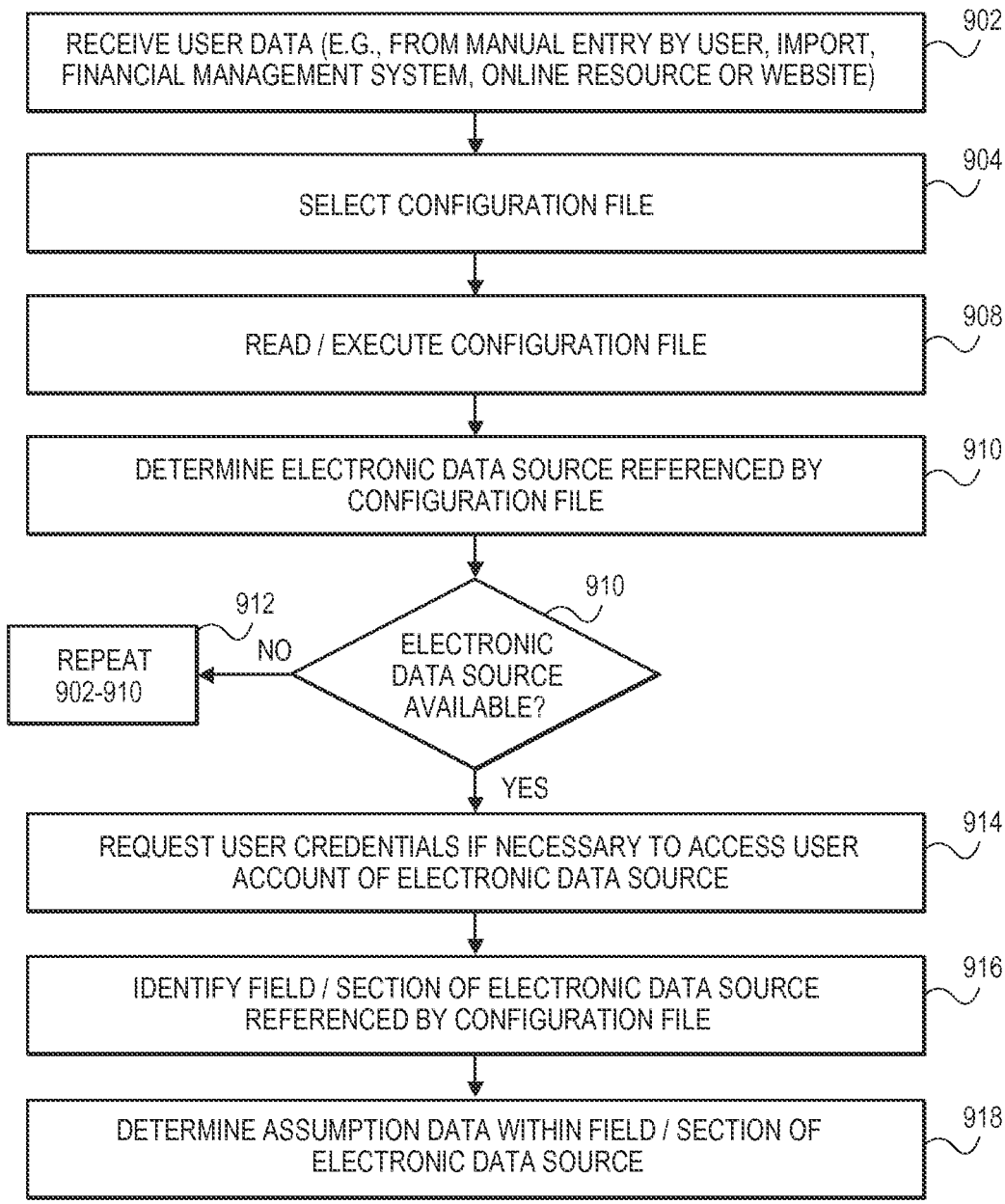
FIG. 9A is a flow diagram illustrating one embodiment for determining assumption data using a pointer or reference within a configuration file to an electronic data source containing assumption data.
Figure 9B:
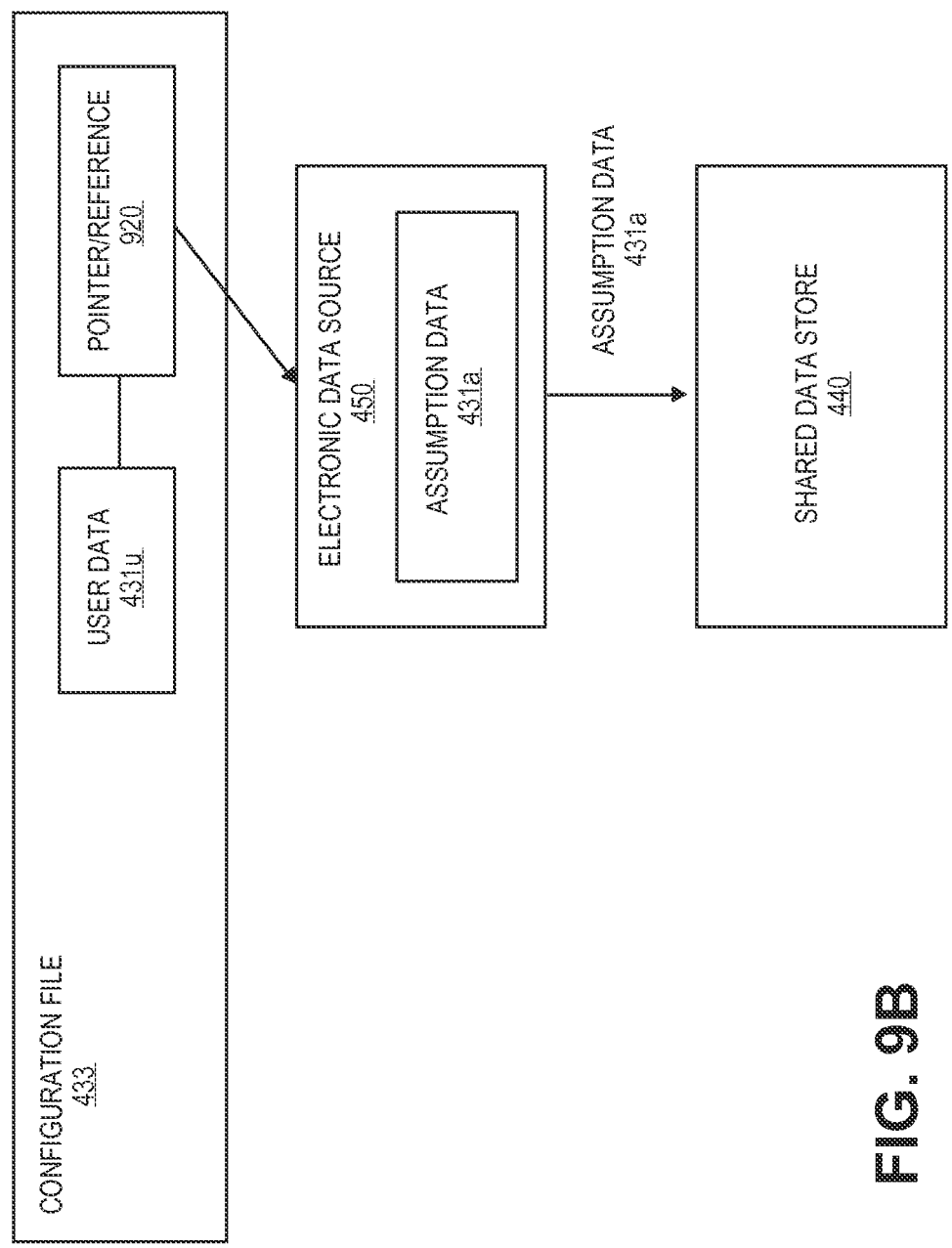
FIG. 9B depicts assumption data within an electronic data source referenced by a configuration file pointer.
Figure 9C:
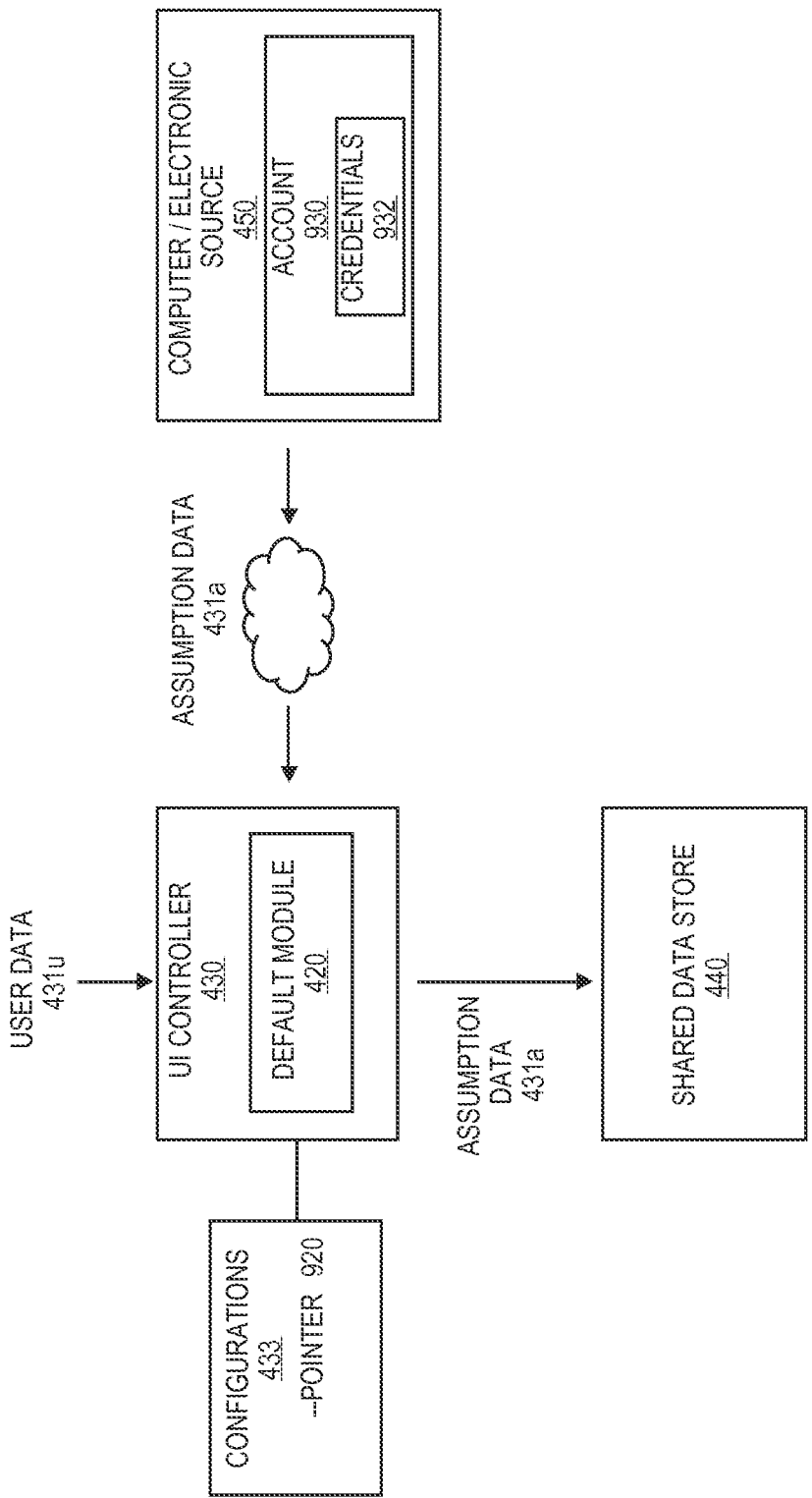
FIG. 9C illustrates an embodiment in which assumption data is received from an electronic data source through a network.

Referring to FIGS. 9A-C, according to another embodiment, rather than having assumption data 431a encoded or included within the configuration file 433 and read by the UI controller 430 from the configuration file 433, the configuration file 433 instead includes a reference or pointer 920 to an electronic data source 450 that includes the assumption data 431a. Thus, at 902, the UI controller 430 receives user data 431u, e.g., from manual entry by user, import, financial management system, online resource or website or other source 450, and at 904-906, as discussed above, selects a configuration file 433 based on the received user data 431u. The selected configuration file 433 is read or executed, and at 908, the UI controller 430 determines an electronic data source 450 that is referenced by or pointed to by configuration file 433 and that includes the assumption data 431a. For this purpose, the configuration file 433 reference or pointer 920 may identify the electronic data source 450, such as an electronic document, file, or webpage, and the document's location, such as a server or computer hosting the electronic data source, a website address, a directory, etc. The configuration file 433 may also specify a particular section of the electronic data source 450 or document such as a field, section, page or paragraph thereof. At 910, the UI controller 430, after determining an electronic data source 450 that contains the referenced assumption data 431a, searches for the identified electronic data source 450 to determine whether it is available and/or accessible. If not, then at 912, no action is taken, and steps 902-910 may be repeated as other user data 431u is received. If so, such as when the UI controller 430 is able to locate a website or file location referenced by the configuration file pointer 920, then at 912, the UI controller 430 determines whether the electronic data source 450 is accessible or whether the user's login credentials 932 are needed, e.g., to access an account 930 the user has with an on-line social networking website such as facebook.com or linkedin.com, or to access an account 930 the user has with a financial management system such as QUICKBOOKS, QUICKEN and MINT financial management systems. If necessary, the UI controller 430, upon determining that the electronic data source 450 is not accessible, may request and receive user credentials 932 if the UI controller 430 does not already have the user's credentials 932 for that electronic data source 450. At 916, having located the electronic data source 450, and obtained user credentials 932 if necessary, the UI controller 430 identifies the field or other section of the electronic data source 450 that was identified by the configuration file pointer 920, and at 918, determines or reads the identified assumption data 431a from the identified field or section of the electronic data source 450.

Embodiments may involve the UI controller 430 receiving user data 431u that was manually entered 450a or provided by the user, and the source of assumption data 431 is an electronic data source 450. Embodiments may also involve the UI controller 430 receiving user data 431u that is from an electronic data source 450, and the source of assumption data 431 is another electronic data source 450.

Figure 10:
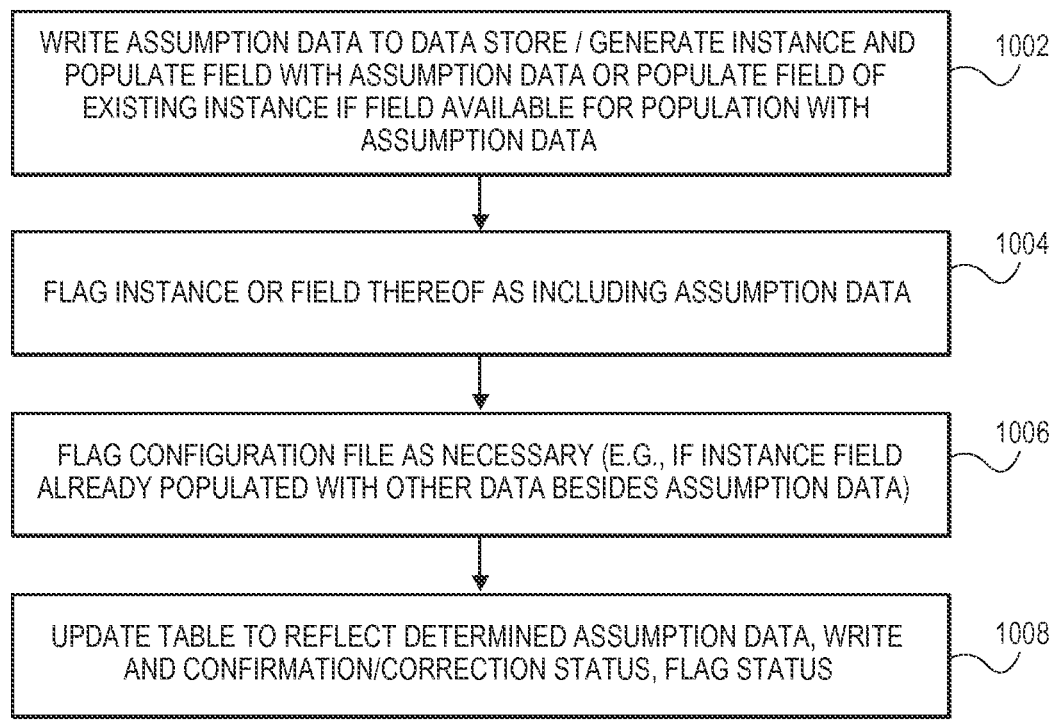
FIG. 10 is a flow diagram of one embodiment in which a user interface controller flags or maintains a table or other data structure regarding the status of assumption data.
Figure 12:
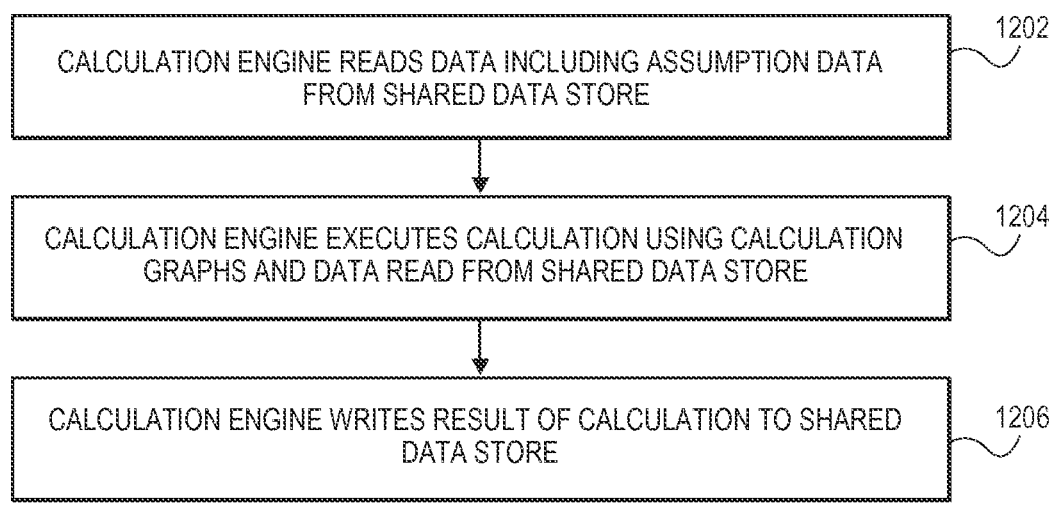
FIG. 12 is a flow diagram showing how embodiments may utilize a calculation engine that generates a result that is written to a shared data store to which assumption data is also written.
Figure 13:
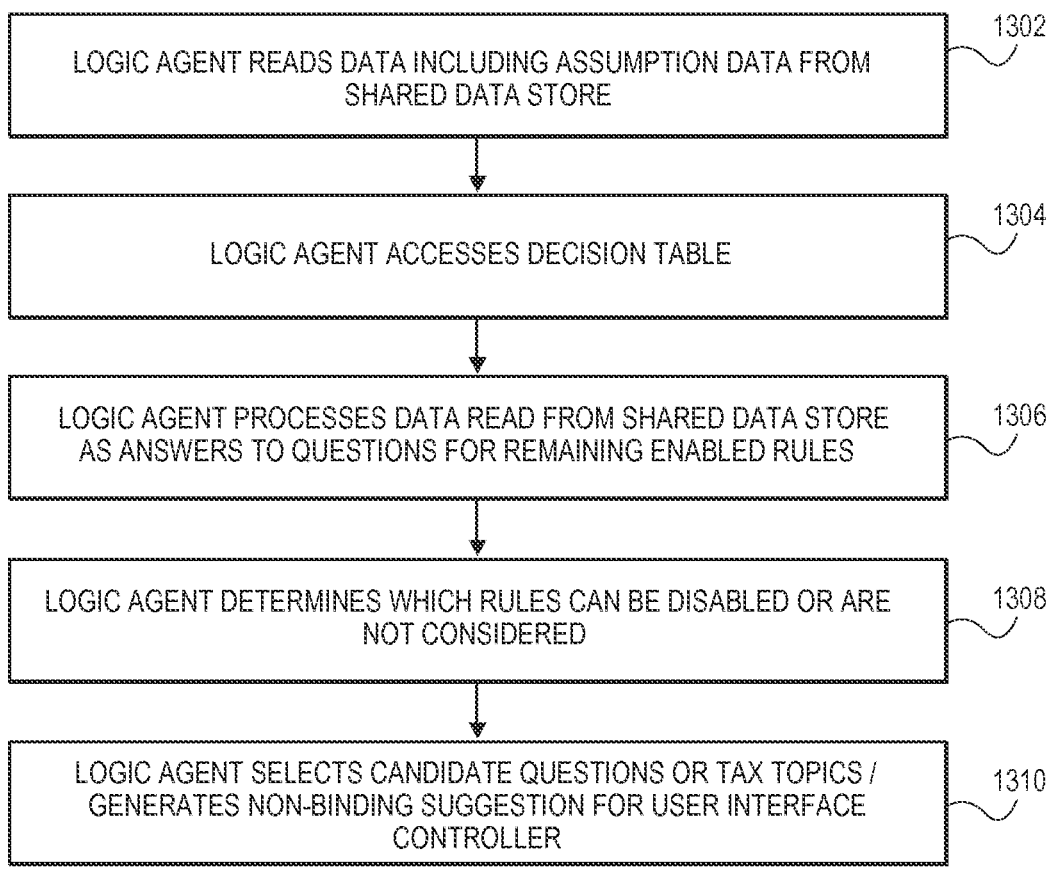
FIG. 13 is a flow diagram showing how embodiments may utilize a logic agent that reads runtime data from a shared data store and that may include one or more of data provided or entered by a user, data imported from an electronic source, assumption data, and calculation result data.

Referring to FIG. 10, at 1002, assumption data 431a, whether read from the configuration file 433 as described with reference to FIGS. 8A-C, or read from an electronic data source 450 referenced or identified by the configuration file pointer 920 as described with reference to FIGS. 9A-C, is written by the UI controller 430 to the shared data store 440 assuming the identified location within the data store 440 is available for population. This may involve writing the assumption data 431a to the associated field of a newly initialized instance 442 based on the schema 446 of the shared data store 440, such that a pre-determined field of the instance 442 being populated with the assumption data 431a, or writing the assumption data 431a to the associated field of an existing instance 442 of the schema 446 of the shared data store 440, or both. Further, assumption data 431a may apply to different types of schema 446 data such that the same assumption data 431a can be included in multiple instances 442, e.g., certain data may be included in an instance 442 for Form W-2 and the same data may be included in an instance 442 for Form 1099 DIV, or for instances for the same tax form.

At 1004, the UI controller 430 may flag the instance 442, or the field of the instance 442 that is populated with assumption data 431a, to indicate that the data was assumed, inferred or derived, as opposed to being entered or provided by the user or imported from an electronic data source 450 such as a financial document or prior year electronic tax return. Additionally, or alternatively, the UI controller 430 may also flag the configuration file 433, e.g., if the field that was to be populated with the determined assumption data 431a was already populated with other data 442, in which case the existing data is not overwritten by the assumption data 431a, and the configuration file 433 can be identified by the UI controller 430 as requiring possible modification or review due to the potential conflict between the determined assumption data 431a and data 442 already present in the identified field.

At 1008, the UI controller 430 updates a data structure such as a table or database reflecting these flags and status of other matters such as identifying the assumption data 431a, whether it was written to the data store 440, the status of instance or field flags and the status of configuration file flags, and whether the assumption data 431a was confirmed and/or corrected by the user.

For example, referring to FIG. 11, a data structure, database or table (generally, table) 1100 may include columns 1102a-g identifying the configuration file 433 that was utilized, the assumption data 431a of the configuration file or identified by the configuration file pointer 920, whether the assumption data 431a was presented to the user for confirmation, whether the user responded by confirming the assumption data 431, data provided by the user to correct assumption data 431a, whether assumption data 431a that was previously stored to the data store 440 was overwritten by data 442 from another source 450, and whether the configuration file 433 or instance 442 or field thereof have been flagged. For example, before storing the assumption data 431a to the data store 440, the UI controller 430 may generate or select an interview screen that is presented to the user and that requests the user to confirm or correct the assumption data 431. The user's response can then be recorded in the table 1100, and if the assumption data 431a is confirmed, it can be written to the data store 440, otherwise if the assumption data 431a is corrected, the corrected data can be written to the data store 440 instead and the configuration file 433 including the assumption data 431 that was corrected can be flagged. In the event that the user corrects assumption data 431a that was already stored to the data store 440, the stored assumption data 431a can be overwritten such that the corrected data is properly stored in the data store 440.

Referring to FIG. 12, and referring again to FIG. 4B, having determined or identified assumption data 431a, stored the data to the data store 440, and updated the data structure 1100 as needed, at 1202, the calculation engine 480 reads the runtime data 442 from the data store 440, which includes assumption data 431 written by the UI controller 430 to the data store 440, and at 1204, executes a calculation using calculation graphs 482 and the data 442 read from the data store 440. At 1206, the calculation result 481 is written by the calculation engine 480 to the data store 440.

Depending on whether any runtime data 442 was initially available, the calculation engine 480 may operate on only assumption data 431a, or assumption data 431a and data from other sources 450 such as data entered by the user, imported from a prior year tax return, imported from an electronic file of a financial management system. Further, as other assumption data 431a is determined and written to the data store 440 as additional user data 431u is received by the UI controller 430, the calculation engine 480 may operate on various types of assumption data 431a that was written to the data store 440 at various times.

Referring to FIG. 13, and referring again to FIG. 4B, at 1302, the logic agent 410 reads the runtime data 442, which may include one or more of assumption data 431a, other user data 431u, data from one or more sources 450 and any result 481 generated by the calculation engine 480, accesses the decision table 460 at 1304, and at 1306, processes the runtime data 442 read from shared data store 440 as answers to questions 462 for remaining enabled rules 461, and at 1308, determines which rules 461 can be eliminated or disabled (e.g., as previously described with reference to FIGS. 5-7). At 1310, the logic agent 410 determines which questions or topics 462 remain or are eligible to be asked of the user, and these questions or topics 462 are the subject of one or more non-binding suggestions 411 generated by the logic agent 410 and provided to the UI controller 430, which determines whether and/or when to present the questions or topics 461 to the user. In response to the presented questions or topics, the user may provide various answers, and this additional user data 431u is received by the UI controller 430, and the additional user data 431u may again be used identify configuration files 433 for determining other assumption data 431a, and the process repeats as the UI controller 430 receives additional user data 431u.

Figure 14:
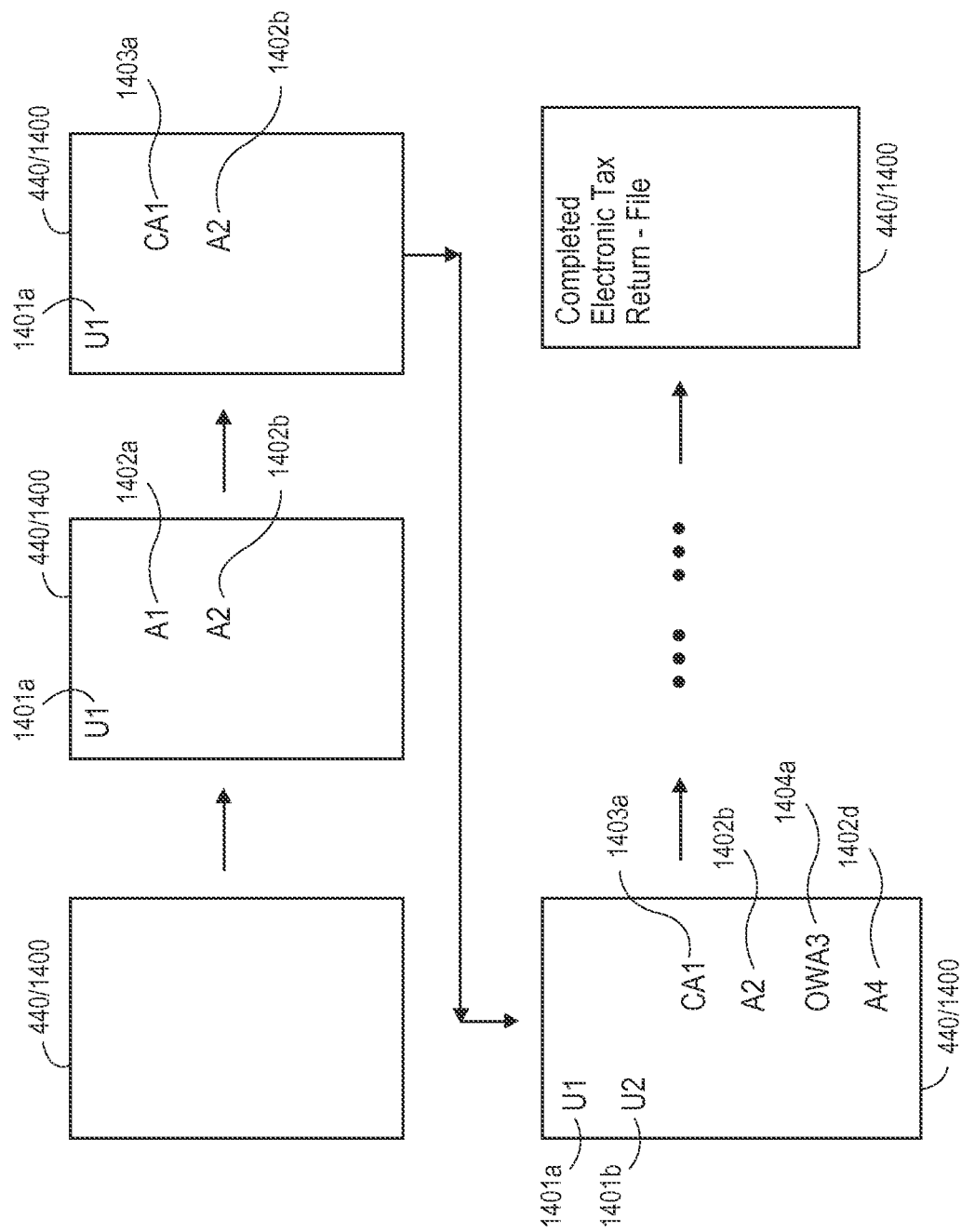
FIG. 14 generally illustrates how assumption data may be determined from user data and included in an electronic tax return, and as preparation of the electronic tax return progresses, how assumption data can be corrected by the user or overwritten by other data.

FIG. 14 generally illustrates how embodiments may be utilized to prepare at least a portion of an electronic tax return 1400. Referring to FIG. 14A, in which no data is stored to the data store 440 and no data is in the electronic tax return 1400, the UI controller 430 may receive user data U1 1401 as a starting point, and determine assumption data A1 and A2 1402a-b. The UI controller 430 may request the user to confirm or correct A1 and A2 1402a-b and the user may change A1 1402a to Corrected A1, or CA1 1403a, but confirm that A1 1402a is correct. Thus, U1 1401a, A1 1402a and CA1 1403a are stored to the data store 440. The UI controller 430 may then receive additional user data U2 1401b, which is used to determine additional assumption data A3 1402c and assumption data A4 1402d. Both assumption data A3 1402c and assumption data A4 1402d may be confirmed by the user as being correct, but at a later time, the user may have imported data from an electronic source 450, such as a prior year electronic tax return, thus OverWriting assumption data A3, otherwise indicated as OWA3 1404a if, for example, the overwriting data 1404a is from a pre-determined source 450 or a source considered to be sufficiently reliable for overwriting the assumption data.

Thus, as generally illustrated in FIG. 15, as preparation proceeds, the data store 440 may include a combination of inferred or assumption data 1501 that was confirmed by the user as being correct, assumption data that was changed or corrected 1502 by the user, user data 1503 that was manually entered by the user or imported from an electronic document, and data 1504, 1505 that was imported from an electronic source such as an electronic tax return for a prior year or from a financial document or file of a financial management system utilized by the user.

When the electronic tax return is populated and completed by the logic agent 410 or by the direction of the logic agent 410 or using one or more components or services 470 as applicable, the electronic tax return can be printed and/or filed with a tax authority such federal state or local tax authority or other tax collecting entity such as Internal Revenue Service and Franchise Tax Board of the State of California.

Following are examples of how embodiments may be implementing using the methods and systems describe above. In one embodiment, the user has an account 930 with an online social networking website such as linked.com. The user may provide login credentials 932 (e.g., username and password) to the tax return preparation application for use by the UI controller 930. Thus, when the UI controller 930 connects with the account 930 using the credentials 932, the UI controller 930 receives user data 431*u* such data from the user's profile, such as the user has a Masters of Business Administration (MBA) from Harvard University and based on the city and state information, or separately provided residence address and zip code information, the UI controller 430 is configured to search for a configuration file 433 that is for criteria matching or substantially matching user data 431*u* of one or more of education, university and zip code. The configuration file 433 may include assumption data 431*a* that based on one or more of these user data 431*u*, it is assumed that the user has an income greater than a pre-determined income amount such that it can be further assumed that earned income credit will not apply. Thus, the assumption data 431*a* of "No" for earned income credit is written by the UI controller 430 to the data store 440 based on the assumption data 431*a* within the selected configuration file 433. Alternatively, the UI controller 430 may refer to a source 450 that provides average incomes for zip codes, lookup the zip code, determine the average income, and use that average income as additional data for the configuration file 433 or another configuration file 433, leading to an assumption of "No" for earned income credit. Thus, when the logic agent 110 eventually reads the runtime data 442 from the data store 440 including "No" as an answer to "Does earned income credit apply" then rules 462 that are based on a "Yes" answer to "Does earned income credit apply" can be eliminated or disabled, thus eliminating these questions 462 and related questions from consideration. Thus, embodiments are able to change the manner in which interview questions 462 are presented to the user and can adapt as user data 431*u* is received. Further, for the questions or topics 462 that are not eliminated, the logic agent 110 can generate a non-binding suggestion 411 for the UI controller 430, which may process the suggestion 411 to generate an interview screen explaining "We believe these sections do not apply to you, correct?" to which the user can respond by confirming or indicating that certain sections do apply to the user.

As another example, the user may manage finances using a financial management system such as QUICKBOOKS or MINT financial management system, and has provided the user's credentials 932 to the user's account 930 with the tax return preparation application so that the UI controller 430 can access an electronic data source 450 in the form of the user's QUICKBOOKS or MINT account 930. Based on the data in the user's account 930, e.g., transaction data reflecting purchases for hotels or airfare, the UI controller 430 can utilize that user data 431*u* to look up an applicable configuration file 433, which is used to determine assumption data 431*a* about travel expenses, and to eventually ask questions about the user's expenses as potential deductions.

As a further example, the user may indicate an occupation of massage therapist, and when the UI controller 430 identifies an applicable configuration file 433, the configuration file 433 is used by the UI controller 430 to determine assumption data 431*a* regarding costs for professional equipment in the form of a massage table.

As yet another example, the UI controller 430 may receive user data 431*u* in the form of the user's name, and execute an internet search, such as a GOOGLE search, or access a database of public records or military records or other electronic data source 450, to search for the person's name. A result may be that the user was in fact in the military. Having this user data 431*u*, the UI controller 430 searches the library of configuration files 433 to select one or more configuration files 433 that are applicable to user data 431*u* "military" and reads or executes the one or more configuration files 433 to determine that certain ranges of specified deductions are likely to apply to the user. Having this information, the UI controller 430 may process non-binding suggestions 411 including questions 462 regarding the identified deductions.

As a further example, if the user data indicates 431*u* that the user is a "student" then the configuration file 433 may indicate various assumption data 431*a* such as the student rents, does not own a home, does not have mortgage interest, does not have property tax, does not have children, and the UI controller 430 can have the user confirm or correct these assumptions 431*a* before writing them to the data store 440.

Figure 16:
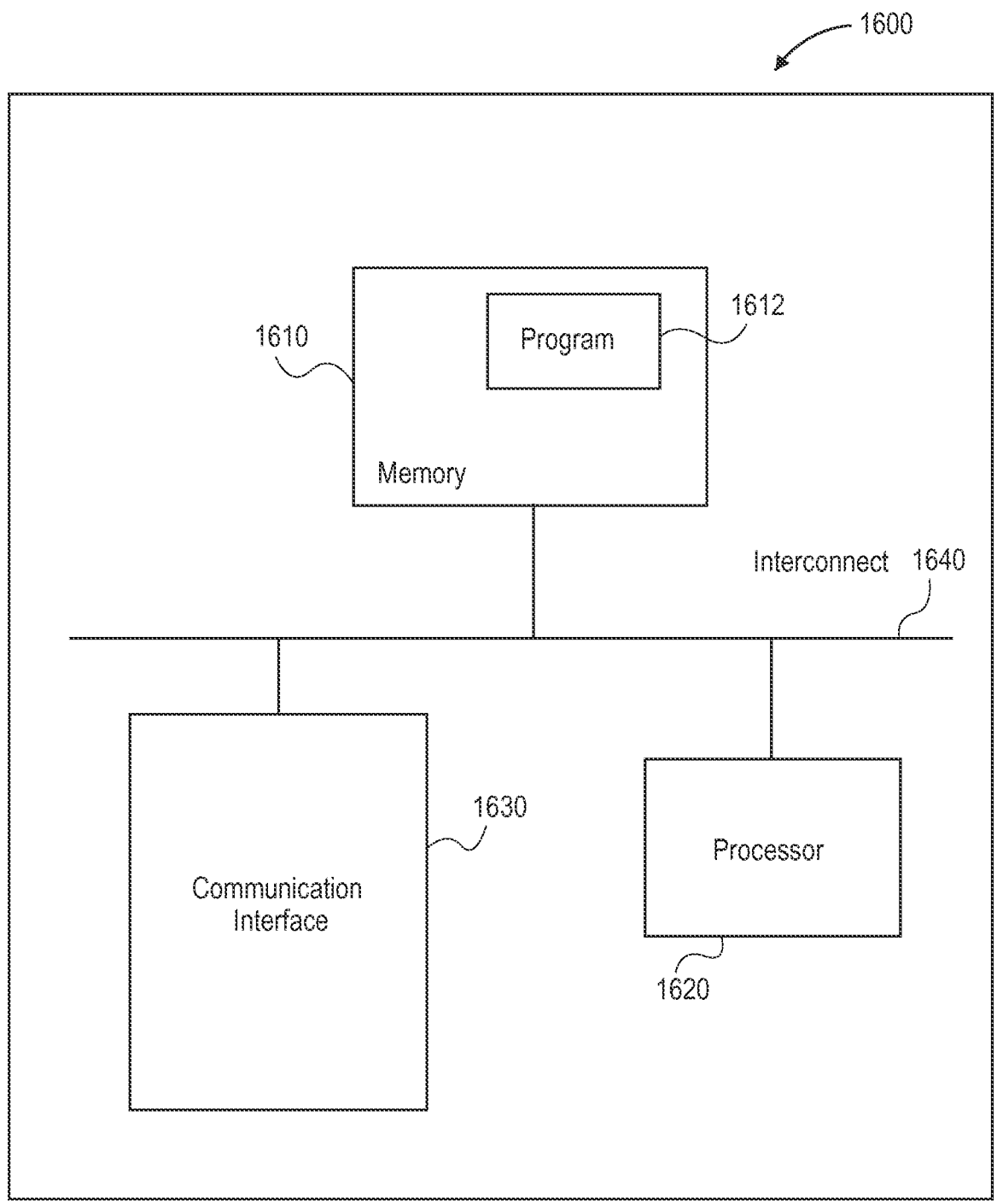
FIG. 16 is a block diagram of components of a system constructed according to another embodiment for performing semantic dependency resolution.

FIG. 16 generally illustrates certain components of a computing device 1600 that may be utilized to execute or that may embody components of embodiments. For example, the computing device may include a memory 1610, program instructions 1612, a processor or controller 1620 to execute instructions 1612, a network or communications interface 1630, e.g., for communications with a network or interconnect 1640 between such components. The memory 1610 may be or include one or more of cache, RAM, ROM, SRAM, DRAM, RDRAM, EEPROM and other types of volatile or non-volatile memory capable of storing data. The processor unit 1620 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1640 may include a system bus, LDT, PCI, ISA, or other types of buses, and the communications or network interface may, for example, be an Ethernet interface, a Frame Relay interface, or other interface. The network interface 1630 may be configured to enable a system component to communicate with other system components across a network which may be a wireless or various other networks. It should be noted that one or more components of computing device 1600 may be located remotely and accessed via a network. Accordingly, the system configuration provided in FIG. 16 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1620 performs steps or executes program instructions 1612 within memory 1610 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

What is claimed is:

1. A computer-implemented method executed by a computerized form preparation application operable to prepare form, the method comprising:

receiving user data by a modular user interface controller of a computerized form preparation application comprising computer-executable instructions executed by a processor of a computer, the modular user interface controller being in communication with a shared data store configured to store instances comprising form data structured according to a schema, the user data comprising data received from one or more data sources coupled to the computer;

selecting, by the modular user interface controller, a configuration file from a plurality of configuration files based at least in part upon the received user data being included in the selected configuration file, reading or executing, by the modular user interface controller, the selected configuration file;

determining, by the modular user interface controller, assumption data based on reading or executing the selected configuration file, wherein the assumption data is not manually entered by the user and is from a source other than a corresponding field of a prior completed form of the user;

determining, by the modular user interface controller, that a first field of an instance generated based on a schema of a shared data store and associated with the assumption data is not populated;

in response to determining by the modular user interface controller that the first field associated with the assumption data is not populated, the modular user interface controller performing the steps of:

writing the assumption data determined by reading or executing the selected configuration file to the first field of the instance in the shared data store, flagging, in the shared data store, the first field of the instance populated with the assumption data to indicate that the field was populated with assumption data that was not entered by the user and that was determined by reading or executing the configuration file, generating or selecting an interview screen comprising a request for the user to confirm or correct the assumption data, presenting the interview screen to the user through a display of the computer, and receiving user input in response to the request through the interview screen indicating confirmation or correction of the assumption data, determining, by the modular user interface controller, that a second field is currently populated with other data and in response, prioritizing the other data in the second field over the assumption data by refraining, by the modular user interface controller, from overwriting the other data with the assumption data and flagging the configuration file from which the assumption data was determined in response to determining that the second field is currently populated;

setting, by the modular user interface controller and based at least in part upon the modular user interface controller receiving confirmation or correction of the assumption data in the first field, at least one current indicator of a data structure, the indicator indicating whether the assumption data written to the first field was confirmed or corrected by the user;

reading, by a modular rule-based logic agent comprising instructions executable by the processor of the computer and in communication with the shared data store and the modular user interface controller, form data including the assumption data retrieved from the shared data store;

generating, by the modular rule-based logic agent, a decision table;

eliminating or disabling, by the modular rule-based logic agent, at least one active rule based at least in part upon the read form data including the assumption data retrieved from the shared data store that are answers to respective questions in the generated decision table and read by the modular rule-based logic agent from the shared data store, wherein eliminating or disabling at least one active rule eliminates at least one candidate question but not all candidate questions presented to the user;

selecting, by the modular rule-based logic agent, a question from a plurality of candidate questions based at least in part upon the decision table including respective rows specifying respective active rules and respective columns specifying respective questions, wherein selection of the candidate question is based at least in part upon active rules of the decision table remaining after the modular rule-based logic agent eliminates or disables the at least one active rule;

generating, by the modular rule-based logic agent, a non-binding suggestion of at least one question to present to the user based at least in part upon the at least one question remaining after eliminating or disabling at least one rule of the decision table;

providing, by the modular rule-based logic agent, the non-binding suggestion to the modular user interface controller;

determining, by the modular user interface controller, to present the question of the non-binding suggestion to the user, generating or selecting, by the modular user interface controller, an interview screen comprising the question of the non-binding suggestion, and presenting, by the modular user interface controller, the interview screen including the question of the non-binding suggestion to the user through the display.

2. The method of claim 1, further comprising:

receiving, by the modular user interface controller, additional data from an electronic data source;

determining that the additional data is for the associated field already populated with the assumption data;
generating or selecting, by the modular user interface controller, a second interview screen to the user requesting the user to select the additional data received from the electronic data source to be utilized for the associated field and presenting the second interview screen to the user through the display;
receiving, by the modular user interface controller and through the second interview screen, a response by the user indicating whether the additional data should be utilized; and
updating, by the modular user interface controller, the data structure based at least in part upon the response.

3. The method of claim 1, the modular user interface controller writing the assumption data to the associated field comprising:
initializing a new instance based on the schema of the shared data store, wherein a field of the new instance includes the assumption data; and
populating a field of a previously generated instance with the assumption data.

4. The method of claim 1, the modular user interface controller writing the assumption data to the associated field comprising:
writing the assumption data to a field of an existing instance of the schema of the shared data store that was generated before the assumption data was determined by the modular user interface controller.

5. The method of claim 1, the modular user interface controller writing the assumption data comprising:
initializing a first new instance and a second new instance based on the schema of the shared data store, and
populating the respective fields of respective first and second new instances with the assumption data.

6. The method of claim 1, wherein the shared data store comprises a previously generated first instance, and wherein the modular user interface controller writing the assumption data comprises:
populating a field of the previously generated first instance with the assumption data:
generating a second instance based on the schema utilized by the shared data store; and
populating a field of the second instance with the assumption data.

7. The method of claim 1, further comprising:
utilizing, by the modular rule-based logic agent, the assumption data to eliminate or disable at least one rule of the plurality of rules, and to enable or maintain as enabled at least one other rule of the plurality of rules, wherein the modular rule-based logic agent selects a question or topic based at least in part upon a rule that was enabled or maintained as enabled.

8. The method of claim 1, further comprising:
reading, by a modular calculation engine of the form preparation application comprising instructions executed by the processor of the computer and in communication with the shared data store and the modular user interface controller, data including the assumption data from the shared data store;
executing, by the modular calculation engine, a calculation with the data including the assumption data read from the shared data store and generating a result based at least in part upon the assumption data; and
writing, by the modular calculation engine, the result to the shared data store;
wherein the data read by the modular rule-based logic agent from the shared data store includes the result generated by the modular calculation engine, and one or more questions or tax topics selected for the non-binding suggestion is the result read from the shared data store.

9. The method of claim 1, wherein the configuration file indicates whether the user confirmed the assumption data specified by the configuration file.

10. The method of claim 9, further comprising:
identifying or flagging, by the modular user interface controller, the configuration file when the user did not confirm the assumption data specified by the configuration file.

11. The method of claim 9, further comprising the modular user interface controller:
receiving data of other users of the form preparation application; and
identifying or flagging the configuration file when a pre-determined minimum number or percentage of other users of the tax return preparation application did not confirm the assumption data specified by the configuration file.

12. The method of claim 1, further comprising:
modifying, by the modular user interface controller, the selected configuration file based at least in part upon assumption data that was corrected by respective users a pre-determined minimum number of percentage of times.

13. The method of claim 1, further comprising:
writing, by the modular user interface controller, the assumption data to the shared data store by initializing a new instance based on the schema of the data store, the new instance including the assumption data.

14. The method of claim 1, wherein the modular user interface controller presents a first number of questions to the user as a result of using the assumption data, the first number of questions less than a number of questions presented by the modular user interface controller without using the assumption data.

15. The method of claim 1, wherein the modular user interface controller does not present a pre-determined type or category of question or tax topic to the user as a result of the assumption data.

16. The method of claim 1, responsive to the modular user interface controller determining that the field is partially populated with data stored in the shared data store, the method further comprising:
receiving, by the modular user interface controller, second user data;
selecting, by the modular user interface controller, a second configuration file based at least in part upon the received second user data;
reading or executing, by the modular user interface controller, the selected second configuration file;
determining, by the modular user interface controller, second assumption data that was not provided by the user or previously stored in the shared data store; and
writing, by the modular user interface controller, the determined second assumption data to the shared data store.

17. The method of claim 1, wherein the modular user interface controller selects the configuration file based on the received user data comprising an answer entered by the user into an interview screen generated by the modular user interface controller.

18. The method of claim 1, wherein the modular user interface controller selects the configuration file based on the received user data comprising data of a prior year electronic tax return.

19. The method of claim 1, wherein the modular user interface controller selects the configuration file based on the received user data comprising data of an electronic file of a financial management system utilized by the user.

20. The method of claim 1, wherein the assumption data is specified within the configuration file and not previously provided by the user or determined from an electronic file provided by the user.

21. The method of claim 20, the assumption data specified by the configuration file being based at least in part upon statistical data of other users of the form return preparation application.

22. The method of claim 1, the selected configuration file pointing or referring to a field of an electronic document or electronic data source from which the modular user interface controller reads the assumption data and writes to the share data store.

23. The method of claim 22, the field of the electronic document or electronic data source being specified by the selected configuration file based at least in part upon statistical data of other users of the form preparation application.

24. The method of claim 1, wherein the modular user interface controller selects the configuration file based at least in part upon receiving a pre-determined type or category of user data.

25. The method of claim 1, wherein the modular user interface controller selects the configuration file based at least in part upon receiving user data from a pre-determined source.

26. The method of claim 25, the pre-determined source comprising an electronic tax return of the user previously filed with a tax authority.

27. The method of claim 25, the pre-determined source comprising a computerized financial management system utilized by the user, the method further comprising receiving, by the modular user interface controller, login credentials of the user to access data of an account the user has with the computerized financial management system to determine user data within the account.

28. The method of claim 25, the pre-determined source comprising an online resource with which the modular user interface controller communicates through a network.

29. The method of claim 28, the online resource comprising an account the user has with an online social networking site, the method further comprising receiving, by the modular user interface controller, login credentials of the user and accessing the account the user has with the online social networking site to determine the user data within the account.

30. The method of claim 1, wherein the modular user interface controller selects the configuration file based at least in part upon receiving the user data of a pre-determined type or category and the user data satisfying pre-determined criteria.

31. The method of claim 1, wherein the computerized form preparation application is a computerized tax return preparation application.

\* \* \* \* \*